United States Patent
Jakobsson

(10) Patent No.: US 10,951,435 B2
(45) Date of Patent: Mar. 16, 2021

(54) METHODS AND APPARATUS FOR DETERMINING PREFERENCES AND EVENTS AND GENERATING ASSOCIATED OUTREACH THEREFROM

(71) Applicant: Amber Solutions, Inc., Dublin, CA (US)

(72) Inventor: Bjorn Markus Jakobsson, Portola Valley, CA (US)

(73) Assignee: Amber Solutions, Inc., Dublin, CA (US)

( * ) Notice: Subject to any disclaimer, the term of this patent is extended or adjusted under 35 U.S.C. 154(b) by 0 days.

(21) Appl. No.: 16/585,438

(22) Filed: Sep. 27, 2019

(65) Prior Publication Data
US 2020/0106637 A1 Apr. 2, 2020

Related U.S. Application Data

(60) Provisional application No. 62/737,448, filed on Sep. 27, 2018.

(51) Int. Cl.
*H04L 12/28* (2006.01)

(52) U.S. Cl.
CPC ...... *H04L 12/2829* (2013.01); *H04L 12/2812* (2013.01); *H04L 12/2838* (2013.01)

(58) Field of Classification Search
CPC ............ H04L 12/2829; H04L 12/2812; H04L 12/2838; G08B 19/00; G08B 21/0211
USPC ....................................................... 340/521
See application file for complete search history.

(56) References Cited

U.S. PATENT DOCUMENTS

| | | |
|---|---|---|
| 6,756,998 B1 | 6/2004 | Bilger |
| 7,610,616 B2 | 10/2009 | Masuouka et al. |
| 9,990,786 B1 | 6/2018 | Ziraknejad |
| 2007/0143826 A1 | 6/2007 | Sastry et al. |
| 2009/0203355 A1 | 8/2009 | Clark |
| 2013/0300534 A1 | 11/2013 | Myllymaki |
| 2014/0096272 A1 | 4/2014 | Makofsky et al. |
| 2014/0266698 A1 | 9/2014 | Hall et al. |
| 2015/0355649 A1 | 12/2015 | Ovadia |
| 2016/0012699 A1* | 1/2016 | Lundy ............... G08C 17/02 340/521 |

(Continued)

OTHER PUBLICATIONS

U.S. Appl. No. 16/527,826 filed in the name of Bjorn Markus Jakobsson on Jul. 31, 2019 and entitled "Managing Access Rights of Transferable Sensor Systems."

*Primary Examiner* — Ojiako K Nwugo
(74) *Attorney, Agent, or Firm* — Ryan, Mason & Lewis, LLP

(57) ABSTRACT

An apparatus in an illustrative embodiment comprises at least one processing device comprising a processor coupled to a memory. The processing device is configured to determine a physical layout of at least a portion of an area that includes a set of sensor devices of a sensor network, to receive data generated by at least a subset of the set of sensor devices, the subset comprising at least a first sensor device of a first type and a second sensor device of a second type different than the first type, to compute one or more predicates based at least in part on the physical layout and the received data, and to take at least one automated action based at least in part on the one or more computed predicates. Other illustrative embodiments include methods and computer program products.

20 Claims, 5 Drawing Sheets

(56) References Cited

U.S. PATENT DOCUMENTS

| | | |
|---|---|---|
| 2016/0035159 A1 | 2/2016 | Ganapathy Achari et al. |
| 2016/0117917 A1* | 4/2016 | Prakash ................ G06Q 10/00 340/514 |
| 2017/0026194 A1 | 1/2017 | Vijayrao et al. |
| 2017/0033942 A1 | 2/2017 | Koeninger |
| 2017/0195130 A1 | 7/2017 | Landow et al. |
| 2017/0230193 A1 | 8/2017 | Apte et al. |
| 2018/0061158 A1 | 3/2018 | Greene |
| 2018/0174076 A1 | 6/2018 | Fukami |
| 2018/0301006 A1 | 10/2018 | Flint et al. |
| 2018/0342329 A1 | 11/2018 | Rufo et al. |
| 2019/0036928 A1 | 1/2019 | Meriac et al. |
| 2019/0068716 A1 | 2/2019 | Lauer |
| 2019/0104138 A1 | 4/2019 | Storms et al. |
| 2019/0268176 A1 | 8/2019 | Pognant |

* cited by examiner

METHODS AND APPARATUS FOR DETERMINING PREFERENCES AND EVENTS AND GENERATING ASSOCIATED OUTREACH THEREFROM

RELATED APPLICATION(S)

The present application claims priority to U.S. Provisional Patent Application Ser. No. 62/737,448, filed Sep. 27, 2018 and entitled "Methods and Apparatus for Determining Preferences and Events and Generating Associated Outreach Therefrom," which is incorporated by reference herein in its entirety.

FIELD

The field relates generally to information processing systems, and more particularly to systems that process sensor data.

BACKGROUND

Traditional sensor-based systems, such as alarm systems, are not intelligent and require the triggering of sensors connected to a controller that generates alarms in response. Although various types of artificial intelligence (AI) using inputs from sensors are also known in the art, a need remains for accurate and efficient techniques that can provide deeper analysis, without requiring vast amounts of tagged data. For example, it would be highly desirable to have techniques that can both provide an understanding of an observed space as well as react to the derived understanding in a manner that provides optimal benefit to users.

SUMMARY

Illustrative embodiments provide techniques for determining preferences and events and generating associated outreach therefrom. Such outreach illustratively comprises various types of automated actions that are performed based at least in part on predicates each computed using data generated by multiple sensor devices.

In one embodiment, an apparatus comprises at least one processing device comprising a processor coupled to a memory. The processing device is configured to determine a physical layout of at least a portion of an area that includes a set of sensor devices of a sensor network, to receive data generated by at least a subset of the set of sensor devices, the subset comprising at least a first sensor device of a first type and a second sensor device of a second type different than the first type, to compute one or more predicates based at least in part on the physical layout and the received data, and to take at least one automated action based at least in part on the one or more computed predicates.

In some embodiments, computing one or more predicates based at least in part on the physical layout and the received data comprises obtaining first received data that includes one or more explicit identifiers, obtaining second received data comprising sensor data without explicit identifiers, and computing from the first and second received data at least one anonymized predicate that does not include any explicit identifier. The anonymized predicate is illustratively indicative of at least one of an activity associated with a user within the area, and a classification of a user within the area.

In some embodiments, taking at least one automated action based at least in part on the one or more computed predicates illustratively comprises determining presence or absence of a user within a particular portion of the physical layout from the one or more computed predicates, responsive to presence of a user, determining if the user is a registered user, responsive to the user being a registered user, initiating a user verification process for the registered user, and responsive to the user not being a registered user, initiating an alert.

One or more illustrative embodiments include a heuristic-based inference engine that relies on inputs from a collection of sensors including sensors such as, for example, motion, WiFi, Bluetooth, humidity, temperature, carbon monoxide, energy consumption, sound, inertial sensors for the detection of impact and movement, and/or other sensor types. We disclose heuristic methods based on collections of sensors like these, and how these methods can be used to generate an understanding of the observed space in an automated manner.

This understanding illustratively corresponds to an identification of preferences and events, among other informational elements, where preferences may help the system self-configure to user wishes as well as identify discrepancies indicative of a home invasion or other emergency situation; events may be threatening events, desirable events or events that, if detected, help the system configure to the needs of the user. Outreach is not limited to notification of the user(s) associated with an observed space, but also involves, in some embodiments, automated negotiation of services for purposes of predictive maintenance, an improvement of content provision by way of conveying preferences to content providers, and numerous other types of additional or alternative outreach.

The disclosed system in some embodiments implements methods to maintain user security and privacy, which are poised to be problems of increasing importance, particularly as people deploy increasing numbers of IoT devices in their home, where IoT denotes Internet of Things. The configuration, maintenance and use of such devices potentially pose risks to end users unless properly managed.

These and other illustrative embodiments include but are not limited to systems, methods, apparatus, and computer program products. The illustrative embodiments are advantageously configured to address and solve one or more significant problems of conventional approaches, as outlined in more detail elsewhere herein.

DETAILED DESCRIPTION

Figure 1:
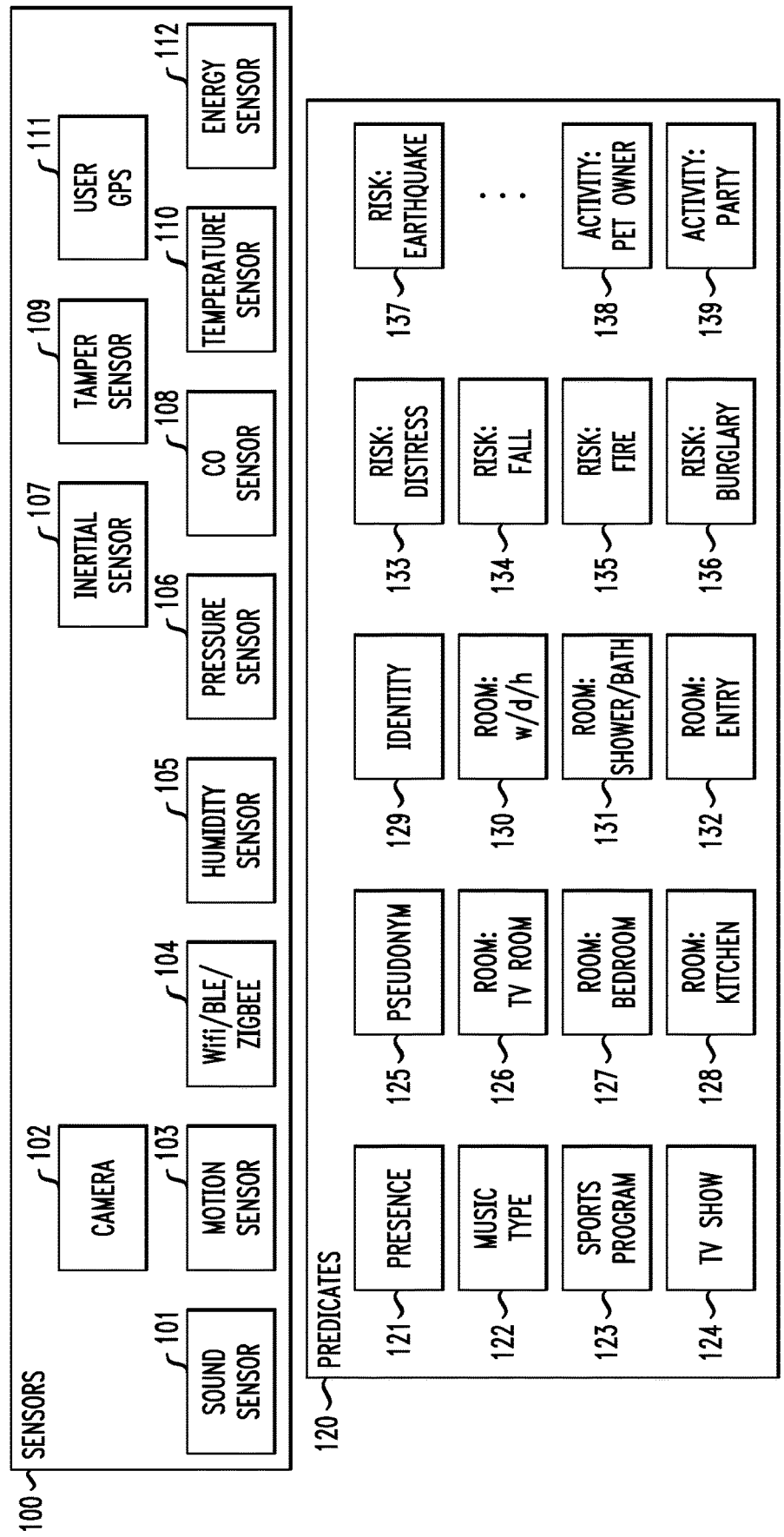
FIG. 1 is a block diagram of an information processing system comprising a set of sensors and a corresponding set of predicates that can be generated using outputs of the sensors in an illustrative embodiment.

Illustrative embodiments will be described herein with reference to exemplary information processing systems and associated computers, servers, storage devices and other processing devices. It is to be appreciated that the embodiments described below are presented by way of example only, and should not be construed as limiting in any way.

Additional techniques that can be applied in some illustrative embodiments herein are disclosed in U.S. patent application Ser. No. 16/527,826, filed Jul. 31, 2019 and entitled "Managing Access Rights of Transferable Sensor Systems," which is incorporated by reference herein in its entirety.

The disclosed technology in some embodiments addresses several long-felt needs in the context of the rapidly developing area of home and office automation. One of these aspects include methods addressing how to automatically extract valuable information regarding preferences, events, layout, space use, and the like, without the need for massive quantities of tagged data. Another relates to how to selectively share data with both trusted and untrusted service providers with the goal of enhancing the user value of system ownership, defraying the cost of services, customize content and services, and providing numerous other desirable features. A third aspect relates to security and privacy aspects related to the processing, communication and sharing of data, a core aspect of which is an abstraction of sensitive user data to create anonymized predicates related to the preferences and needs of users, as well as to events related to the system.

In one embodiment, a likely location of a user is determined by computing a presence predicate relative to one or more nodes in a network, where sensor data from one or more nodes is processed and a node is selected in a manner that maximizes the probability that an observed event, observed using the sensors of one or more nodes, is best observed at the node for which the presence is determined. Here, "best" may correspond to the strongest signal, the signal with the least attenuation, a signal corresponding to multiple correlated sensor values that are strongly correlated and for which the signal is strong, or related techniques. In addition, triangulation techniques can be used to determine relative position and movement.

The system preferably establishes a physical layout of the network of nodes based on multiple presence determinations over time, e.g., a determination of the sequence of selections of one node being the one with the greatest likely proximity to a given observed person. This does not have to be the same person, as the system can determine, using statistical methods, that two nodes are co-located due to them often being selected in temporal series as the most likely location of a user.

Given a network map corresponding to the layout of a space, established in this way, the system also can determine with high precision the location of a user as he or she moves through the space by looking at historical or common movements, and observing a series of presence determinations, in addition to using the outputs of the sensor of the nodes in the network. This increases the accuracy of the determination, and allows predictive capabilities that are useful to proactively respond to likely events, e.g., lighting a path ahead of a person walking through a building, but only lighting areas where the user is, has just been, or is likely to go next. The same predictive provision can also be made to audio content, allowing the user to experience a speaker phone that follows him or her around as he or she moves through an apartment or office, as well as other features based on predictive establishment of location. This is useful both for convenience and for security, where first-responders such as law-enforcement and firemen can benefit from the use of the security features.

A user pseudonym can be generated using two types of inputs: a presence assertion, as established above, and an observation an event that is associated with one user. Here, one such event is the transmission of a media access control (MAC) address or other hardware identifier, or use of a session key or other software identifier, by a mobile user, where the observation is made using a node equipped with a radio unit, which is an example of what is more generally referred to herein as a "radio sensor."

This observation can be made independently of whether the node is actively engaged in the transmission or only is a passive recipient. Note that radio signals will be strongest in close proximity to a node (and its associated sensors), and especially so if the power of the radio is very limited. This way, the system correlates location assertions (which may be made in a probabilistic manner with multiple rather likely options being output along with their assessed probabilities) and radio proximity locations. This correlation can also use triangulation, and will benefit from the map of network nodes described above. When there is a strong correlation between the location as asserted by the proximity predicate and the observation using the radio of a sensor, then the MAC address or other identifier is associated with the person whose location was assessed to correspond to the location of the presence assertion.

Multiple identifiers can be assigned with one and the same user, as illustrated in FIG. 1. Multiple users may use one device as well. The pseudonyms generated in this way, which may be simple local identifiers associated with MAC addresses and other identifiers, correspond to tagged data. This tagged data can be used to train machine learning (ML) components that take other sensor data such as sound and motion data, and correlates the user pseudonyms with such data in order to generate a classifier that, given the sensor data such as sound and motion alone, and without any MAC address or other signal received by a radio unit, assigns a set of sensor observations to a pseudonym.

Having profiles associated with pseudonyms permits the system to personalize the treatment of users, which has both convenience benefits and security benefits. These benefits will be further detailed below. A pseudonym can be an identifier, such as a MAC address, or a locally unique value that is associated, in a database, with one or more identifiers, such as MAC addresses. A user can be given multiple pseudonyms, where these pseudonyms may either correspond to the likely user or the likely device. The system can detect that one identifier is used by multiple users, possibly using Global Positioning System (GPS) data to disambiguate the users. For example, knowing that user A is in Chicago based on user A's phone being there, and noticing that user A's iPad is used in user A's home, in the living room, the system knows that somebody else uses user A's iPad. If the use of it is also associated with user B's phone, location-wise, then the system associates user A's iPad with both user A and user B. The system can determine which user it is based on additional sensor data, such as GPS data, distinguishing sound data, data that the system obtains from accessing the user's calendars and email, and other types of data. This enables the system to identify common use, for purposes of convenience, configuration, but also, for enhanced security, where the latter is enabled by detecting anomalies.

The disclosed system introduces privacy-protecting methods to classify sound content, thereby identifying user preferences. The system distinguishes, for example, the sound profiles of different sports and different music genres from each other, and is configured to store information deduced about these predicates; however, the system preferably does not store sound recordings, and therefore actively ignores conversations in the observed space, except for voice input that is determined to correspond to voice commands to the system. These are preferably placed in the context of the observed events. For example, it is important for the classification of an observed sound sample that is "help help help" to know (a) whether this is being said in the context of a higher-than-normal risk for distress; in the context of a known movie that contains this voice segment; or in the context of apparent children's laughter. Thus, the system identifies and classifies contexts, events and situations, and use these classifications to perform actions while minimizing the risk for false positives and false negatives.

The disclosed system is further configured to detect the location of and operation of various appliances, such as washer, dryer, water heater, HVAC (heating, ventilation and air conditioning) appliances, refrigerator, oven, microwave, dishwasher, fans, etc.; and is identifying rooms based on the use of identified appliances in these rooms. If the system identifies that an appliance has a change in its usage profile, e.g., generates a sound that was previously not observed; consumes energy in a manner that was not previously observed, and the like, then this is indicative of a risk of malfunction. In addition, if the sensor outputs associated with such appliances are indicative of a known type of malfunction, then this comprises an estimate of a classification of a potential need for maintenance, a potential risk, a potential need for the replacement of the appliance, and/or the need for a user action.

Such information is very important to derive and act on, and accordingly, the system determines events that are likely to match such situations or needs, based on the sensor output profiles observed by the system. These profiles can be in the time range, for example, as in a typical reporting of sensor output values, or in the frequency range, for example, as in the reporting of a Fast Fourier Transform (FFT). The use of correlation between outputs is useful whether the values being processed are in the time or frequency range. Correlation between multiple types of sensor outputs is beneficial to obtain derived sensor profile data taking multiple dimensions of sensor data into consideration.

Other risks, such as earthquakes are also detected by the disclosed system, along with associated responses to minimize the risk of such events, and methods to streamline and aid the work of emergency responders. A person skilled in the art will recognize that the disclosed methods are only exemplary, and that they are used to illustrate the operation of the system and the benefits of the system.

The system is configured to convey predicates selectively to trusted third parties, such as one or more advertisers or advertisement providers, and is also configured to enable the outreach to individual third party service providers, e.g., for purposes of predictive maintenance. We disclose methods to make such connections in a way that is compatible with the existing advertisement infrastructure, which is famously demanding in terms of the time constraints it poses on its components in terms of enabling rapid auctions of advertisements based on known criteria and user profiles.

In one embodiment, this is achieved by establishing a connection between a user device and an advertisers or advertisement provider, and to either piggyback or separately convey profile data such as classifications of user actions, needs, spaces, and the like, to the advertiser or advertisement provider. This enables the integration of physical systems such as smart homes and smart offices into the traditional advertisement infrastructure in a backwards compatible manner, and without re-architecting how existing systems operate. For purposes of predictive maintenance, this can be offered to the user by notifications and discount coupons tied to third-party trusted service providers, where such third-party trusted service providers are billed as they connect to the service provider to obtain details related to the needs of the user. Such needs identify the believed source of the problem, the type of equipment, when known, and what parts may be needed based on such analysis. In addition, the third-party trusted service provider is given access to location information and contact information of the user, which the user consents to being provided by enabling the received coupon or other offer.

These are new structures enabling substantial economic benefits for all parties involved, and significant improvements in the precision with which assessments can be made, translating into savings in time and convenience for those involved. In the case of the predictive maintenance scenario, it is also enabling a tight-knit reputation system leveraged by a feedback channel from the user and a measurement-based feedback channel from the sensors associated with the nodes associated with the predictive maintenance or other system modifications, as applicable. Namely, the service provider can determine when the representative of the third-party service provider started making modifications; when the modifications concluded; and that the installation resulted in a non-anomalous operational profile. If defective parts were mistakenly or backhandedly used, the service provider would in many instances be able to detect this based on the energy consumption profiles observed in context of the expected profiles.

Thus, third-party service providers that do not provide quality service can be excluded by the service provider, or given lower priority, lower pay for the negotiated service, or other discouraging mechanisms for enforcing desirable behavior; analogously, highly dependable and reliable third-party service providers can be given priority, bonuses, or other encouragements. This weeding of third-party service providers produces an improved service provision to the end user. As will be understood by a person skilled in the art, these are just exemplary embodiments of which there are a large number of variations of related benefit. More generally, commercial offers, including advertisements are preferably generated in response to detected needs, which comprise needs for maintenance, needs for products, needs for service as well as other needs identified based on the determined example predicates, as will be understood by a person skilled in the art.

In addition to using heuristic methods for classification, the system preferably also uses ML models, which are preferably bootstrapped by training them on the output from the heuristic models. This is another benefit of the disclosed approach, as it increases the convergence speed of the ML model while minimizing the amount of externally provided tagged data and the quantities of sensor data that is needed for the model to become accurate.

The disclosed system operates well in isolation, as described above and in the details provided with the figures, but does also benefit from interaction with components that are not part of the sensor networks, but which can be accessed using an application programming interface (API) or other feed. For example, knowledge of the GPS location of a registered user is beneficial for predicting when that user will return home (or arrive in the office, for a space corresponding to an office as opposed to a home). This can be obtained using an API to a service provider that reads GPS location, such as some search engines do for example, as well as directly from the user's cellular phone, on which the user has an application ("app") that can be used to control the space and to query the space about environmental data.

Moreover, the system can also integrate with cleaning robots, such as Roomba™ units, many of which provide layout information as a service. However, even without the active participation of the cleaning robot, the system can infer the layout of the space and the location and shape of obstacles. That is because typical cleaning robots have wireless capabilities, and therefore, can be detected and identified based on their MAC address or other hardware identifier. This detection is preferably made by multiple nodes equipped with radio units, thereby allowing these to collectively triangulate the location of the cleaning robot with frequent intervals, simply based on signal strength of the observed cleaning robot radio as observed by one or more nodes equipped with a radio unit.

In one embodiment, at least some nodes comprise an IR transmitter compatible with typical consumer electronics (TVs, stereos, DVD players, etc.), just like universal remote controls, and are used to control associated equipment. In one embodiment, a user indicates in a portal associated with the service provision that a new piece of equipment has been plugged in, along with its position and an identification of its type (such as "Samsung TV, 55-inch flat screen" or "Philips DVD player"). The backend service consults a database to determine the encoding of signals for the corresponding device, and then provisions associated user apps associated with phones, tablets and similar to enable the operation of the introduced equipment.

The location can be determined by the user turning on the equipment in response to a challenge from the system, resulting in a detectable change in the energy consumption or load on the corresponding outlet, assuming the equipment is plugged in to a smart outlet supported by the backend. Alternatively, the user indicates the location of the new equipment from a pull-down list of locations, each location which corresponds to a system identified room; or indicates a location by making a loud noise in the room, or by otherwise responding to a challenge by the system that results in the detection of an action by the user. One such action is to hold up the user's phone or tablet to an outlet or switch or other type of node in the proximity of the installed equipment. Another alternative is that the system cycles through all possible power-on sequences for the IR transmitters in the space associated by the system, and determines from the power consumption, load determination, or sound output from the equipment when the new equipment has been turned on. This is preferably not done in a way that activates already introduced equipment.

These processes, and variants of these, are used to establish a node in the proximity of the new equipment, and the encoding to be used to control the new equipment, thereby enabling the remote control, using a software remote control in the form of an app, to be used to control the equipment. This can be combined with parental control techniques to limit screen time, whether on an equipment basis, location basis, depending on the individual app or device used to control the equipment, or other techniques.

It can also be used for automated control of equipment, e.g., for using a stereo system as an alarm clock, but without the stereo system having to be able to determine the time—this is done from a central location of control to which the user establishes and enables the alarm. A person skilled in the art will recognize that this approach can be used for a large array of consumer equipment that is controllable by remote controls, including audio equipment, TVs, recorders, disc players, free-standing and built-in fans, heaters and air conditioners, smart locks, pet doors, pet feeding systems, plant watering systems, and so on.

An important enhancement associated with the disclosed technology is the simple process of introduction of the equipment into the system, requiring a minimum of effort and knowledge; another is the enhanced functionality and control made possible by the connection of the disclosed system to compatible units that can be remote controlled. The latter enables the node network and the associated control structure to advance the benefits of the users greatly while maintaining simplicity, controlling cost, and maintaining centralized management that simplifies security and privacy in an array of ways.

The disclosed techniques can be used to gain information about users that is both privacy sensitive and much more insightful than current methods. For example, the system can determine the presence of one or more users in a TV room, and can determine the programming; then infer the time of the commercial, if applicable; and determine the user actions during the commercial. Did one or more users leave the room at the time of the commercial? Was it to get a snack (go to the kitchen), go to the bathroom, etc.? To the extent that the identity of one or more users leaving the room can be determined, what are their known genders and ages, based on demographic information collected, MAC address and other device identifiers? Was the volume turned off? Based on the sound associated with the programming, and based on the sound in the TV room, was there conversation? Was that timed towards the end of the commercial? Was there laughter? These are important types of insights that can be gained, and in terms of statistics, shared with advertisers, TV networks, and others.

Similarly, it is of relevance to know—both for programming and commercial segments, the information relating to the people in the TV room. Based on motion sensor data and traces from presence data, how many users are present? Based on MAC addresses and other device identifiers, what are the pseudonyms and/or identities of these? Based on collected demographic information and information obtained from user behavior, what are the demographics of these users, and what are their previously observed preferences and behavior? This is valuable to know to determine what programming is appreciated for various users, both on an individual basis in order to determine user preferences and improve recommendations, and in terms of statistical determinations. The disclosed system enables these and other related queries to be answered, based on the disclosed stricture, as will be appreciated by a person skilled in the art.

One benefit of the disclosed technology is how it can inform first responder decisions. Examples of such decisions include firemen prioritizing rescues, police rapidly confronting gunmen, and helping search-and-rescue teams find earthquake survivors trapped in the rubble of collapsed buildings. For all of these, an automated and immediate understanding of the likely location of people is significant;

for a case involving active shooters, it is also vital to know the location of offenders as opposed to potential victims. This can be achieved by detection of gunshots and an immediate tracking of the associated location of all people in the presence of the detected shootings.

It may be impossible to eliminate active-shooter situations; but it is possible to provide real-time insights to the professionals that jump into active-shooter situations. An important goal of the system in the present embodiment is to aid the responders and help protect lives. The combination of discretely-placed IoT devices, gunshot audio detection, and cloud-based analysis, control, and notifications enables the following benefits during active-shooter situations:
 1. Real-time gunshot detection
 2. Real-time gunshot location identification and tracking
 3. Estimation of number of active shooters
 4. Identification and communication of shelter-in-place warnings
 5. Enable identification and communication of areas for safe and urgent evacuation
 6. Identification and communication of ideal evacuation routes
 7. Remote and secure electrical power control of buildings, circuits, lighting, and individual plugs
 8. Estimation of number and types of gunshots for medical first-responders
 9. Assistance and testing during active-shooter trainings The disclosed system may be deployed within the confines of the existing building electrical system. There is no need to deploy a stand-alone, expensive, and difficult to conceal shooter detection system. Identification and location of gunshots is primarily made through audio detection with fixed-location devices; though this technology is greatly aided with the addition of multiple types of sensors. Algorithms which process a sensor signal automatically predict future sensor states and perform alerts and notification through software and/or other functionally equivalent firmware, hardware, or electronics, for processing data and digitally performing tasks. Notifications and predictions are enabled through smart computing such as artificial, deep learning, forward chaining, inductive reasoning, and machine learning.

This smart computing accesses past data, such as a device configuration and associated data over time, and analyzes that data with software, such as an algorithm, to identify patterns. For example, the described system, when installed pervasively, and paired with active-shooter training scenarios will intelligently improve its performance over time. While much less common, this same technology can be utilized to detect explosions. The disclosed system enables advanced sensing, communication, and control through outlets and wall switches enables a low-cost and discreet gunshot detection system that, when paired with advanced cloud-based functionality, provides valuable insight and control to teachers, students, administrators, and first responders during chaotic active shooter situations. The system, fully integrated into a building's existing infrastructure, is also capable of monitoring environmental conditions, energy usage, movement, and other human behaviors.

First responder services and insights include but are not limited to:
 1. Real-time gunshot location identification and tracking
 2. Estimation of number of active shooters
 3. Identification and communication of shelter-in-place warnings
 4. Enable identification and communication of areas for safe and urgent evacuation
 5. Identification and communication of ideal evacuation routes
 6. Remote, secure, and arc-free electrical power control of buildings, circuits, lighting, and individual plugs
 7. Estimation of number and types of gunshots for medical first-responders
 8. Assistance and testing during active-shooter trainings
 9. Automatic generation of structure interior map
 10. Dog presence alert
 11. Number of souls in structure
 12. Automatic remote door lock/unlock
 13. Car running in garage
 14. Whole structure lighting control The disclosed system processes often sensitive sensor data and generates from it user predicates, most of which are not sensitive and which therefore can be shared with third-party service providers such as home security companies, contractors performing predictive maintenance, advertisers interested both in understanding individual users better for reasons of improved product suggestions, and to gain a better understanding of users as a collective. The latter is enabled by deep insights into the causes and effects related to user observations; how users respond to advertisements and product placements; what motivates end users; and numerous other insights. The disclosed predicates rely on heuristics, which means that they do not depend on large-scale deployments or tagged data.

From these first-level predicates, more complex predicates matching user personalities can be generated. For example, knowing how individual users spends their day at home in the context of their location, actions, search queries, web-site visits, TV shows watched, eating habits, entertainment preferences, as well as their responses to commercials, news and other content, allows unprecedented insights into what motivates people. This will, in turn, improve the provision of services to these users, as well as to others, based on correlation of behaviors and an improved consumer understanding.

The disclosed system determines the use of various spaces based on identified use, detected temperature, pressure, humidity, associated energy consumption, and possibly additional or alternative information. This enables the automated distinction of a bedroom from a TV room, for example. It can also be used to identify a space as a basement, attic, garage or an outdoor area. For example, an attic may be very warm in the summer. The direct benefits of installing an attic fan can be computed based on temperature swings of a detected attic space and the associated heating of interior rooms, compared to detected or reported outdoor temperatures, and a resident can be presented with offers for purchase and installation of attic fans, where such offers could potentially be subsidized by electricity service providers wishing to curb mid-day electricity consumption, or simply acting as an aggregator of offers to reach scale. Detecting temperatures in a garden is helpful to determine what plants may be most suitable, to augment national weather forecast data by a dramatic expansion of the number of sensors. Temperature and humidity measurements can be used to identify high fire risk zones.

The disclosed system detects a running engine—whether by sound or by carbon monoxide detection—and automatically opens garage doors or starts exhaust fans. The disclosed system further determines the need for a new muffler or other car repair based on garage-centric sound profiles. It determines what a garage is likely used for—e.g., storing cars, motorcycles, or neither—based on sound profiles. The system further determines that a room is likely a garage based on temperature swings and the sound of garage door openers, and offers to connect the garage opener to user-controlled apps, using IR transmitters in outlets or switches to communicate with the garage door opener.

The heuristic techniques work as a rule-based system, where the computation of predicates is based on sensor output, user registration data, already computed predicates, the time of the day, and profile data determined for the user(s) associated with the sensors of a space. For example, when determining the location of a user present in the space. A collection of nodes report measurements to a backend or other data collector. This is either raw sensor data or functions of such data, where the functions are locally computed at nodes or aggregators associated with the network. In our example, several nodes detect a sound, but three of them detect the sound much stronger than the others. Two of the nodes in the network detect a motion that is correlated with the sound, and two other nodes detect motions that are not correlated with the sound. Among the two nodes that detected the correlated motion, the one with the strongest sound signal is selected as being most strongly associated with the location of the present user, and that node is output as corresponding to the location of the presence of the user.

In a network where relative location of nodes has been established, e.g., from series of measurements as the above, a collection of sensor measurements are used to triangulate the location of the user, based on a selection of a small set of the nodes having been selected as being close to the user. If there are several users that are active in a space, the above algorithm generates multiple locations based on correlations between sounds and motion data. Other sensor data can also be used, e.g., an inertial sensor can be used to detect vibration associated with a person walking, and correlated with sound data. In another example, sound data is available, but no motion sensor data. This still enables the system to determine a likely location of a user, by correlating detected sounds with each other and identifying the location of the strongest signal or the signal with the greatest correlation with the others.

Correlation is preferably performed both in the temporal and frequency spectrum, just as for other embodiments. The node with the strongest signal or correlation is selected as the location of the user. The system can also detect location by identifying mobile hardware, such as phones, based on changing location (in terms of node identity) of the signal strength associated with the mobile hardware, as identified, for example, by determining what node has the greatest signal strength for the reception of radio signal, wherein a pseudonym is extracted from the radio signal or two different radio signals are distinguished from each other based on the different signals they correspond to. The node with the strongest radio signal is selected as the location of the user corresponding to the mobile hardware.

Preferably, the system integrates multiple location determinations such as the ones described here and selects a location using a voting strategy, where each node that "wins" one of the described "competitions" receives one vote and the node with the maximum number of votes is selected as the location of the user. A more advanced version of this algorithm assigns three votes to the winner, two votes to the runner-up node, and one vote for the node with the third-highest value of the location assertion, whether based on the signal strength of one type of sensor or multiple types. The node with the largest number of votes wins. This is performed for each detected signal—e.g., if there are two users in a space, and both emit sounds, moves, interact with radios using hardware they transport, and similar, then the signal collections are clustered based on the correlation of the inputs, after which the above determinations are made for each one of the clusters.

In addition to determining the approximate location of a user, a pseudonym is preferably computed for each user. The pseudonym can be short-lived, and simply used to correlate one location detection to one that is made right afterwards. Such a pseudonym can be determined based on the FFT of the sound data detected, for example. This allows the system to "follow" a user as she moves around in the space, determining a series of locations. This is helpful to determine what the user is doing, whether the user is stressed, and how the locations are related to each other, among other things.

A better and more long-lived pseudonym is one that is based on a MAC address or other hardware identifier, or a session identifier associated with a WiFi connection or a software identifier based on the profile of the data being communicated using the detected device; for example, this profile can be used to distinguish watching a movie or listening to streamed music from being on a phone call or simply walking around without actively transmitting data, the only signals corresponding to automated maintenance connections between the mobile hardware and the system. In addition, the system uses available DNS data to determine sessions and to identify likely activities. To the extent that search data is available in an unencrypted format, e.g., in the URLs being requested, such data is also used both to identify sessions and to determine preferences, interests and activities.

Once a location (corresponding to the "presence" predicate) and a pseudonym are computed, these two predicates are preferably used to compute other predicates, along with raw sensor data. Many of these derived predicates use multiple previous predicates in the form of a history. For example, the determination of what is likely to be a bedroom is performed based on detecting a long-term presence with a very weak signal (not much movement, not much sound, and with periodic lack of signal), preferably during the same time of the day (or night) for a series of days. For example, the system may determine that a user enters an area at 10:35 pm, and that a user—presumably the same—exits the area at 6:00 am, and that there is intermittent minor movement and sound in between. On a second day, the system, may detect the arrival of a user at 10:25 pm and the departure of a user at 5:52 am, with low-strength sensor signal associated with the space in between. After a few days of largely consistent determinations of this type, this area, defined as the space covered by a small set of nodes and associated sensors, is determined tentatively to be a bedroom. As more classifications that are consistent with this classification are made, the certainty of the classification improves. This can be expressed as a score, a probability, or as a variance computed from different individual observations.

The energy profile associated with an outlet is indicative of the use of the outlet. By computing FFTs of the energy consumption, the system distinguishes common appliances (such as refrigerator, microwave, hair dryer, and dishwasher) from each other, and associates these with the outlet used. This is done by comparing the computed FFTs to stored FFTs obtained from known appliances and stored in a database associated with the backend. This database preferably contains FFT profiles associated with multiple brands and models, and also, FFT profiles associated with common types of malfunction or needs for repair. In addition to FFTs, the system also stores temporal data indicating the periodicity with which power is drawn, e.g., every 30 minutes (as might be typical of a compressor for one freezer, during a time the freezer door is not opened) or every morning around 7:00 am (as may be associated with a toaster, a hair dryer, or an on-demand water heater).

This profile data is used to determine the likely function of the area where the node is located (e.g., kitchen or bathroom); the likely type and model of the appliance; the likely state of the appliance, including being recently introduced in the system, having recently changed in terms of its power consumption profile; and other features and characteristics. This is preferably correlated with the pseudonym of the user associated with the appliance, as applicable.

The system determines preferences of users associated with a space by identifying sound signals, preferably based on their FFTs, as being correlated with genres or individual content pieces. For example, the system identifies likely music based on the FFT spectrum associated with the detected sound matching a general music FFT profile. This will also overlap with the spectrum of many movies. However, temporal aspects can be used to distinguish the two. For example, music is commonly broken into series of a length of a few minutes, where two series are commonly separated by another FFT profile, such as that of conversation or one of relative silence. Music commonly also changes in terms of spectrum every few minutes. In contrast, a movie does not exhibit these temporal aspects, but commonly has other indicators. For example, comedies can be detected by the sound profile associated with laugh track.

A more fine-grained determination can be made as well, wherein the system distinguishes likely jazz music from likely rock, and distinguishes a sitcom from a tennis match, based on FFT comparisons with representative segments of content stored on the backend, and based on temporal determinations such as the periodicity of detected sounds (whether laughter; a tennis ball smack; a drum; etc.) Furthermore, the detection and classification of the sound is also done in the context of multiple nodes, enabling an improved determination of the layout of the space. Furthermore, as the system identifies the likely location of the sound source, this is used as input to the determination of the use of a space, e.g., a TV room is where TV sound is commonly heard. Since people may have a TV in other rooms as well, each room can have multiple classifications, e.g., a room may be both a bedroom and a TV room, or both a kitchen and music listening room.

The system correlates the energy consumption patterns with the use of a TVs, stereos, etc., in order to determine the location of the associated equipment. This is useful for control of the system. For example, when the system determines that nobody is at home, some appliances such as TVs may have their power supply reduced or turned off by the system in order to reduce the consumption of phantom power. However, the system would not turn off the power supply to a router, a refrigerator or a yet-unclassified appliance. This demonstrates another type of benefit associated with an automated determination of functionality, whether of appliances or areas of use.

The determination of the type of room a node is associated with is helpful for the system to interpret sensor output associated with this space and initiate actions. For example, determining that a space is a garage simplifies the classification of observations made after that. The sound of a motorcycle in a garage, for example, suggests that the resident may have a motorcycle; the same sound in a TV room does not imply the same conclusion. Similarly, the sound of a broken muffler in a garage is a meaningful observation in the sense that it could lead to the generation of a coupon for a replacement muffler; the same sound in the kitchen does not have the same meaning. The sound of cries for help are important if the TV is not on, but should be ignored if the TV is on and the system identifies the movie as one in which somebody cries for help. The motion and inertial sensor output associated with a fall is much more likely to correspond to a fall if it is observed in a room that is identified as the shower room, bathroom, or stairway, and following the sound of water being used. In contrast, the sound of impact and inertial sensor output suggesting a correlated crash to the floor is likely to be less risk in a children's playroom, as it may simply correspond to a child jumping off a bed. The detection of correlated inertial sensor output for all sensors is likely to correspond to an earthquake, or possibly, an explosion; however, the localized detection of such output is likely to mean that something or somebody fell to the floor.

Observing series of detections helps disambiguate high-risk events from their potential false positives. For example, detecting a series of impacts in a playroom is much less indicative of the risk of a person falling that the detection of one such impact. Detecting loud voices or cries before a fall is much more likely to correspond to an altercation than a detected fall without loud voices or cries. Similarly, the same detection in the context of a space with only one detected user is almost certain not to correspond to an altercation. However, a risk of falling is much more significant for a space with only one apparent occupant than a space with multiple occupants, just like the risk of falling is not of great concern if it is followed by normal motion, such as walking around than if it is followed by a user being stationary or near-stationary. The detection of cries for help is more significant in context of higher risk. Thus, to suppress false positives, the system preferably determines the degree of risk, based on heuristics such as these, when evaluating potential indicators of a user needing help, such as cries for help.

The raw sensor data is typically sensitive from a privacy perspective. For example, moment-by-moment motion data may be uncomfortable for many people to share with non-trusted parties, as is sound data potentially revealing conversations. However, general needs such as a need for a new muffler; general preferences such as a preference for R&B over classical music and tennis over football; risks such as the risk of burglary; as well as locations such as a bedroom being adjacent to a study, are not very sensitive in terms of their privacy implications. At the same time, advertisers and service providers find these non-sensitive predicates much more valuable than the raw sensor signals, as the predicates correspond directly to needs and opportunities. For the same reason, users are more likely to be willing to share such data, as it helps them obtain benefits such as predictive maintenance, get discount coupons for events and products of relevance, and get help and protection when needed.

The disclosed system creates a platform for sharing of non-sensitive predicate data, and the protection of sensitive sensor data and user registration data. The system helps selectively share such predicate data in the same way that the current smart phone architecture invites app creators to access some device data while protecting other types of data, thereby enabling a new economy based on secure and privacy-respecting sharing of curated data. External service providers such as burglar alarm services benefit from this, as do service providers such as contractors performing maintenance, and landlord interested in making sure that their property is protected.

In one embodiment, sensor data is locally processed, e.g., one or more nodes comparing the sensor outputs they observe to determine the location of a user; or centrally processed, e.g., all sensor data being transmitted to a cloud computing resource or centralized server; or a combination, e.g., local nodes determining what signals to transmit based on one or more criteria, and based on the phase of the system, where the system may transmit more data in a discovery or configuration phase than what it would in a later "usage" phase.

In some embodiments, at least a portion of the processing is performed locally, on the system, as opposed to on a backend. This is to ensure adequate performance of the system even in the case of degraded or disrupted Internet connection. In the case when determinations, classifications or generations of predicates, as described in this disclosure, are performed on a local system, it is beneficial to transmit the inputs (or a description of these) that caused a decision to be made, along with the decision or a description of this, to the backend, once this is possible. This enables an audit trail that is important in case of catastrophic situations and system failures, as well as the opportunity for the system to fine-tune the functionality and respond to end-user complaints relating to perceived failures. This is due to the fact that the situations can be re-enacted, simulated and analyzed on the backend.

Thus, such information is preferably transmitted, to the extent it is possible, and stored in a log associated with the end-user system. To the extent that the processing leading to the determination is made by the backend in the first place, the saving of the relevant inputs and the resulting output or decision are likewise stored in the log. In both of these contexts, an input is considered relevant if it is commonly or always a factor associated with the decision of the associated type, is used as an input to the rule, or is otherwise associated with the decision.

Additional illustrative embodiments will now be described with reference to FIGS. 1 through 8.

FIG. 1 shows a collection of sensors 100 and a set of predicates 120 derived from at least some of the data provided by sensors of the collection of sensors 100. The collection of sensors 100 illustratively corresponds to one or more network nodes, which may comprise, for example, an outlet, a switch, a breaker, or an appliance such as a router, a smart appliance, a portable user device, etc. A given network comprising multiple such network nodes may correspond to multiple distinct collections of sensors from which data is being obtained and analyzed. The analysis can be performed, for example, on the individual node generating the data, on a node or other device that connects to one or more nodes that generate the data, or on a backend server that is connected to the network of nodes. The connections can be made at least in part using built-in radio units, such as a radio unit that is both a sensor in that it detects radio signals, and a communication port from one node to another, forming a local network that is connected using the Internet or other network to a backend server.

The collection of sensors 100 comprises one or more sensor units, where example sensor units include a sound sensor 101, a camera 102, a motion sensor 103, a radio unit 104 that may use WiFi, Bluetooth, Bluetooth low energy (BLE), near-field communication (NFC), ZigBee, and other types of radio; and which may comprise one or more of such units mounted on one or more separate boards associated with the collection of sensors 100. Additional sensors of the collection of sensors 100 comprise a humidity sensor 105, a pressure sensor 106, an inertial sensor 107, a carbon monoxide (CO) sensor 108, a tamper sensor 109 that detects that one or more of the sensors associated with the collection of sensors 100 is physically manipulated, or that the conveyance of the signals from the collection of sensors 100 is physically manipulated. The collection of sensors 100 further comprises a temperature sensor 110 and an energy sensor 112. The energy sensor 112 is configured to detect energy consumption or other types of energy use. Also included in the collection of sensors 100 is a user GPS sensor 111. Such a sensor is illustratively accessible via an API, and in some embodiments comprises a device that has GPS functionality and is associated with a user of the system. An example user GPS sensor 111 is the GPS unit of a handheld device such as a phone, which is accessed by the system via an API to access the location of the user. Although single instances of these and other sensors are shown in the collection of sensors 100, there can be multiple instances of one or more of the sensors, as well as multiple collections of different sensors, in other embodiments.

The various sensors illustrated in the collection of sensors 100 are examples of what are also referred to herein as "sensor devices." One or more of the different sensor types shown in the collection of sensors 100 can be configured to provide proximity information, and a given such sensor is an example of what is more generally referred to as a "proximity sensor." Other types of proximity sensors can be used in other embodiments. Some sensors disclosed herein are implemented as respective IoT devices.

It should be noted that the term "predicate" as used herein is intended to be broadly construed, so as to encompass, for example, various types of information in various formats, including those illustrated in the set of predicates 120 of FIG. 1, that are each computed using outputs from multiple sensors. A predicate in some embodiments therefore comprises, for example, information computed as a function of outputs of two different sensors of different types, such as a proximity sensor and a radio sensor.

One or more instances of a presence predicate 121, each also referred to as a presence 121, may be computed as a function of outputs from sound sensor 101, camera 102, motion sensor 103, as well as other sensors belonging to the collection of sensors 100. For example, if a first instance of sound sensor 101 registers a louder sound than a second instance of sound sensor 101 of the same network, such an event is likely to correspond to the sound source being closer to the installation of the node corresponding to the first instance of sound sensor 101 than to that of the second instance of sound sensor 101. At the same time, if motion sensor 103 or camera 102 associated with the same node as the first instance of sound sensor 101 registers the presence or change of location of an entity, this is likely to correspond to a user being in the proximity of the associated node. If there is no output from the sound sensor 101 instance of a first node but there is output from motion sensor 103 or changing output from camera 102 associated with the first node, then this is also indicative of the presence of a user.

In addition, other sensors can be used to improve the estimate corresponding to the presence 121 of a user, e.g., the inertial sensor 107 can be used to detect heavy footsteps; this is particularly useful if the output of the inertial sensor 107 is correlated with the outputs of sound sensor 101 or with motion sensor 103, etc. Thus, by detecting strong correlated signals from multiple sensors associated with a node, a presence predicate is determined, where the signals correspond to the arrival of a person close to the node of at least one sensor of the collection of sensors 100.

By keeping state of the location of the user, and determining what collection of sensors, at any point in time, registers the strongest confidence that a person is present, based on the strength of the signals and their match to the signal profiles typically corresponding to the arrival or presence of a person, the system can maintain an understanding of the presence of users even if they are still and silent, and potentially not visible to a camera. This is because the presence of the user will be detected as the user arrives, but there is no signal from the collection of sensors 100 of the associated node or another node that the user in question has moved away. Having access to serial presences, in terms of the nodes that register presence, of one or more users, the system establishes a physical layout of the network of nodes and their associated collection of sensors 100. This is illustrated in the example arrangement of FIGS. 2 and 3.

One or more instances of a pseudonym predicate 125, each also referred to as a pseudonym 125, may be derived from the MAC address of a device physically associated with a user, as determined by the presence predicate described above and the strength of the input to radio unit 104. A particular user may be associated with multiple MAC addresses. The system determines the common patterns of movement of devices, as represented by MAC addresses or other hardware identifiers, and associates MAC addresses that commonly travel together as being associated with the same user. Additionally, the pseudonym associated with this user, which comprises a locally unique identifier, is preferably also associated with the types of devices that the MAC addresses correspond to, the nodes where this user is typically active, and potential activities, preferences and other determinations associated with this node and its surroundings.

When a previously unseen MAC address is detected by the system in the form of transmissions observable with an instance of radio unit 104 of any of the nodes in a network, a profile is preferably created, and information associated with this user is stored. This is beneficial for purposes as distinct as enabling guests to get partial access to the network (such as remote control access to light switches in the room the guest is located, WiFi access, and access to functionalities such as voice-operated alarm clocks for the space the guest is associated with) and for detection of anomalies associated with burglary. In addition, the information can also be used as later evidence of a burglary.

Figure 2:
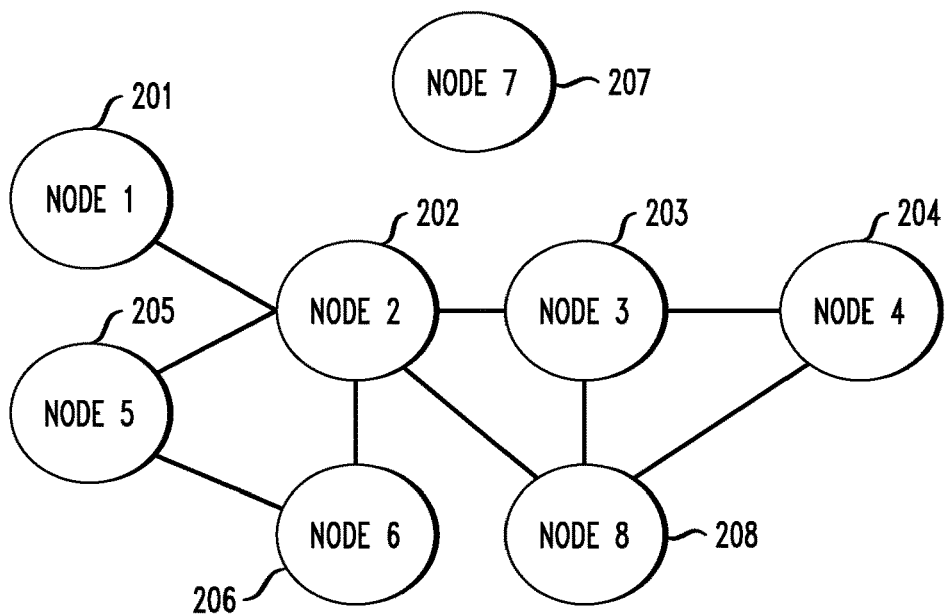
FIG. 2 shows a plurality of network nodes of an information processing system in an illustrative embodiment.
Figure 3:
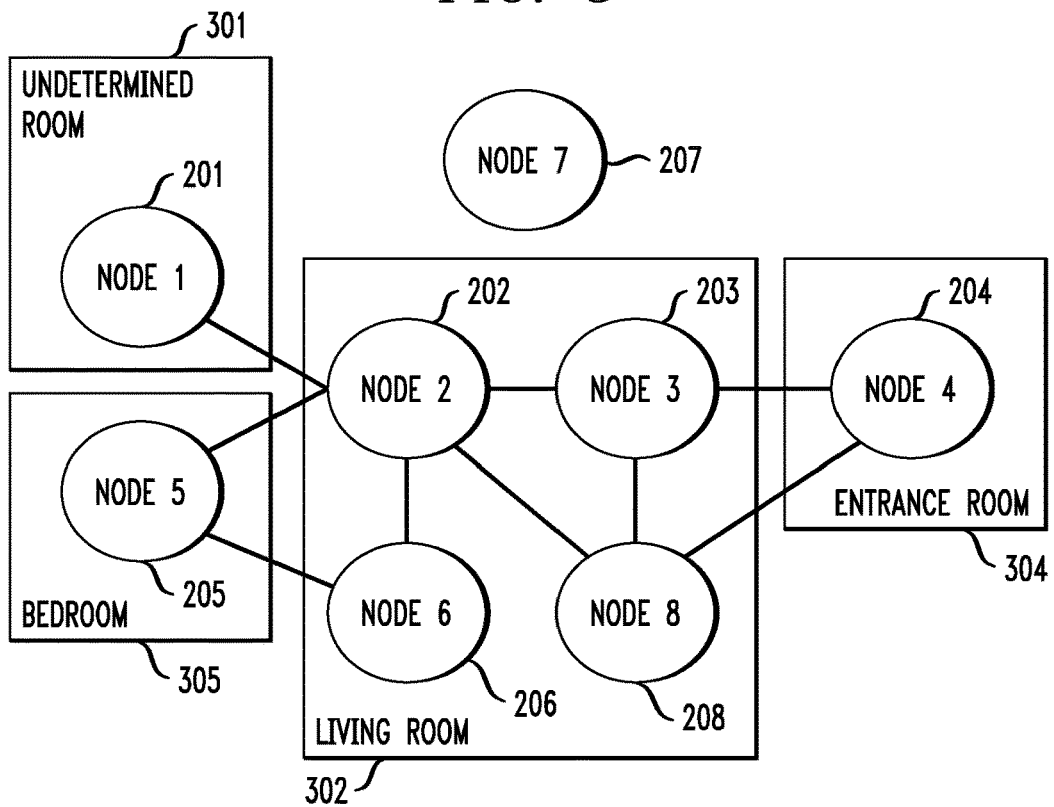
FIG. 3 illustrates association of the network nodes of FIG. 2 with particular rooms of a home in an illustrative embodiment.

The detection of a previously observed pseudonym (whether in the form of a MAC address or other associated indicator) is helpful for purposes of automated configuration and personalization, while the detection of a pseudonym that is not commonly seen in the network associated with its detection is an indication of a potential anomaly, and could be used for purposes of security as well as for audit purposes, where one audit purpose is the collection of evidence of an intrusion. If the tampering of a node is detected via an instance of tamper sensor 109, this is preferably used along with the detected anomaly to generate alarms and produce information about the likely intruder. Intruders can be tracked throughout the space, according to an understanding of the layout of the space (as illustrated in FIGS. 2 and 3), and optionally, locks can be automatically engaged, lights turned on or off, legitimate residents alerted, police alerted, and warnings played on the audio system, including on speakers associated with the nodes, separate appliances, etc.

The system can assign a likely identity to a pseudonym by using identity data provided by a user during a setup session such as a time when the user installs a remote control app on his or her mobile device, requests WiFi access, during initial system setup or configuration, as well as other methods. During such sessions, and while accessing any portal associated with the system, the user typically would use a wireless device in range of one or more of the nodes, and therefore, the traffic and the MAC address would be associated with the identity information from the user, illustratively resulting in a record of a given instance of an identity predicate 129, also referred to herein as an identity 129. This record may also include or be associated with demographic data provided by the user.

The system preferably detects the presence of one and the same user, as identified by her pseudonym and/or identity, over several networks. This enables cross-system customization opportunities, and provides the system with unique insights related to the relationships between different installations. As the system detects the presence of a user with a known pseudonym and/or identity, the system associates detected events, preferences and other predicates derived from the sensor inputs, with the pseudonym or identity, storing this information in a database that can be maintained locally and associated with the network of installed nodes or at a central location with a server that maintains multiple installations of networks of nodes.

The system can determine music type by comparing the sound spectrum to spectrums of different genres of music, e.g., by comparing FFTs or performing image recognition of FFT plots. The system can also maintain identifying segments or FFTs of a set of common songs and match the sound associated with a space with these identifiers. This enables the automated generation of a music type predicate 122. This determination will preferably be done in the context of the determination of either pseudonym or identity, allowing the system to improve the automated selection of music, or of advertisements related to the musical preferences of the user, such as notifications or discount coupons associated with local performances, as well as other correlated preferences.

It is not always important for the system to determine that a person who is known to be currently present is also listening to the music, but close temporal association is sufficient. Therefore, if the system detects the likely presence of a user within a threshold amount of time, such as 10 minutes, and a musical event such as the detection of a particular genre, then the user pseudonym or identity, and the associated profiles, can be associated with the music type predicate 122. In the case where individual songs are detected, the system can go further than general genre detection, and also identify likely preferred artists, pieces, and the like. This is also information that will be stored with the music type profile of a user.

It is important to recognize that this approach is not invasive of a user's privacy: whereas the system will identify the sounds associated with a space, it will not store these sounds, but only descriptions associated with the determinations. That means that conversation that takes place at the same time as the identified music (or at any other time) will not be stored or interpreted, but will only be noise in the background of the classifier that determines the music type. If the conversation is more prominent than the music, the determination of music type predicate 122 may fail where it otherwise, in the absence of the conversation, would have succeeded. However, whether it succeeds or not, the conversation is not processed, and is not stored. To the extent that the sound sensors are used for detection of voice commands, of course, the system will attempt to identify the presence of such voice commands—whether occurring in silence or in the presence of music—at the same time as it may also be attempting to determine the type of music being played. To the extent that the system has a baseline truth for any observation, e.g., the system was used as a remote control to select the music, this constitutes a tag that allows for the use of additional machine learning, and the determination of the success rate of the heuristics based simply on comparison with FFTs or time segments of sound inputs.

Similar techniques are also used to identify sports programs using sport program predicate 123. For example, a soccer match has a sound profile that is very distinct from that of a tennis match, enabling the use of FFTs to compare the sound associated with a space and that of a known sport or other generator of sound profiles. In addition, the system can compare the sound profiles observed with known broadcasting taking place at the time of the observation, e.g. using standard correlation methods between the broadcast stream (slightly delayed to account for the transmission) and the observed sound sequences associated with one or more sensors. Such arrangements can make use of not only sound sensors, but also, for example, inertial sensors (which detect low-frequency sounds), as well as motion sensors to find correlations between user actions and the broadcast sound profile. For example, the user may cheer after a goal is made, as will the on-site audience of the soccer game.

The system therefore maintains sound profiles associated with multiple sports and other sound-generating events, and compares these to observed sound (and other) sensor data; as well as correlating current broadcast sound levels with observed sound levels. This also enables the detection of other TV shows being watched, using one or more instances of TV show predicate 124. This can either be by type (e.g., identifying a comedy by the tell-tale laugh track signature) or by unique program (by sound profile or by comparing time segments of sound data between an observed sample and a stored sample). It is not necessary to limit this to comparison with programming that is currently broadcast, but the same methods can be used to identify on-demand programming. It is beneficial, as described before, to associate music, sports and other programming preferences with pseudonyms, identities, times of the day, other ongoing activities being detected, etc. This can be used for prediction of preferences as well as for detection of anomalies, which signals that a user is maybe not feeling well or has different needs than previously established.

It is beneficial to associate apparent TV programs with a location, which enables the determination, based on signal strength and presence detection, of a room being a TV room 126. As rooms are identified, the data is associated with a set of nodes, which are determined to be in that room or close to that room based on signal strength and consistency of signal strengths for detected sounds and other sensor data. As this is done, the system automatically clusters nodes in terms of their relative distance. The system can also store information relating to the certainty of such a classification. In addition, the system preferably determines the relative location of nodes that are not in the absolute physical area of each other, but maybe in rooms that open up into each other. This is further illustrated in the example arrangement of FIGS. 2 and 3.

The system can determine that a room is likely a bedroom 127 based on the apparent presence of a user during night hours, where this user is inactive for long periods of time. However, a user who works at night and sleeps during the day will also be correctly identified as sleeping, and the room in which he or she sleeps will be labeled accordingly. Thus, the determination of bedroom 127 is preferably based on an activity profile comprising both a sound and motion profile, and potentially also inertial sensor data indicating tossing and turning or snoring, along with the duration of time during which these inputs are rather consistently observed. This enables the likely determination of a room being a bedroom 127, but also helps identifying anomalies in sleep patterns, which can be used to automatically modify environmental configurations, such as the temperature in the room identified as the bedroom 127. By identifying sleep patterns of a user, the system can also modify, within some interval, the time at which the user is woken up by an alarm he or she has set, as the alarms will also be controlled by the system.

In case a user is suffering a medical high-risk situation, as determined by the system, medical help can be requested. This is only possible if the system is able to guarantee very low error rates, which is one of the reasons that it is valuable for the system to identify all events and preferences and then identify anomalies associated with high risk. This can be done only for users who are determined to be alone; only for users expressing fear (e.g., by voice command); or only in contexts of identified high risk for distress 133.

Detecting the location of a bedroom and the likely event of a user sleeping, which is preferably done in a fully automated manner, improves the system's opportunities to protect users when they are the most vulnerable—namely, when they are asleep, and to guide them properly in the case of a high-risk situation. It also places higher requirements on privacy. Thus, the system can process data obtained from rooms determined to be a bedroom 127 in different ways from ways in which data is processed when obtained from nodes associated with other rooms. The disclosed system therefore learns as much as it can about its inhabitants in order to personalize their use of the space as well as to protect them—whether from security or safety risks, or from exposure of personal information that would hurt their privacy.

A room can also be determined to be a kitchen 128 by being used in a manner consistent with kitchen use. This includes being used soon after a user leaves the bedroom in the morning (for breakfast); for having sound profiles from sound sensor 101 indicative of a kitchen (the humming of a dishwasher or the gurgling of a coffee maker); heat profiles from temperature sensor 110 indicative of the use of a stove or oven; the energy consumption profile from an energy sensor 112 matching the operation of a microwave; a refrigerator; a dishwasher, etc.; the correlation between such inputs (e.g., sound and energy consumption, as described above); and possibly others. Additional sensors such as humidity sensor 105 are also used to determine cooking, and is correlated with heat detected by temperature sensor 110. A room that is identified as a likely kitchen 128 faces a different use and risk profile than other rooms, and the system adapts its responses to observed events in the context of knowing the likely room type. In addition, by observing activity in the established kitchen 128, the system can determine the extent to which users eat at home vs. eat out; the extent to which users cook during weekdays; the type of appliances typically used for food preparation; and so on. This informs the risk profile as well as indicates demographic inferences and preference inferences for the users associated with the space, which is helpful for improving the system in terms of customizing configurations, services and content for the users.

As described before, the association of a collection of sensors with a given identified room, as also illustrated in FIGS. 2 and 3, allows the system to better understand the actions of a user and minimize the risk of false positives for inferences being made. For example, detecting likely distress in the context of food being prepared suggests very different actions than detecting likely distress in the context of a user rushing through his or her morning schedule, but at a slightly later time than usual. In the first situation, the user may have cut or burnt himself or herself, and may need first aid guidance or an ambulance; in the latter case, the user may need a reminder not to leave the house with the stove turned on; alternatively an automated or remote method of disabling the stove.

The system can detect that a room 130 has a washer, dryer and/or a water heater ("w/d/h") based on sound profiles determined using one or more instances of sound sensor 101 being matched to stored appliance-specific sound profiles; by energy consumption profiles determined using one or more instances of energy sensor 112 being matched to stored appliance-specific energy consumption profiles; and by correlating the temperatures in the room as determined by one or more instances of temperature sensor 110 to stored appliance-specific temperature profiles; and by correlating the profiles of the different types to each other. For example, when the sound profile is correlated with the energy consumption profiles and the temperature profile with a correlation factor exceeding a threshold associated with a stored appliance-specific threshold, then this is indicative of the associated set of sensors with such outputs being in a space that is labeled as being a room with these appliances, such as a washer and dryer or a water heater. Similar profiles can be detected for other appliances, such as HVAC appliances.

In addition, the sensor profiles associated with these appliances can be correlated to external system requests to control set appliances, e.g., to turn up the AC in one room or to increase the operational temperature of a water heater due to the temperature of delivered water falling according to a temperature sensor believed to be located in the bathroom detecting a temperature increase that is slowing down, or which is not consistent in its increase with the humidity in the room, which in turn is indicative of the amount of water being used.

A room is identified as a shower/bathroom 131 based on the system detecting increased humidity and/or sounds indicative, whether in time or frequency space, of showering, taking a bath, flushing, or other uses of water, as well as changes in temperature accompanying these other inputs, and of correlations between changes of all of these types of sensor output. It is beneficial to know that a room is a bathroom; for one thing, the presence of water in bathrooms increases the risk of accidents such as falls 134, and therefore, the system will be configured to identify, using instances of motion sensor 103 from nodes in a shower/bathroom 131 that a user is potentially falling. Whereas users can also fall in other rooms, the risk is greatest in rooms with water, and rooms associated with stairs, and therefore, the identification and labeling of such rooms is important. Stairs can be identified based on sound detected by sound sensor 101 and motion detected by motion sensor 103 for nearby nodes. Inertial sensor 107 is also beneficial to detect impact, which results from falls. Multiple instances of these and other sensors can also be used.

An entry room 132, also referred to herein as an entrance room, can be identified based on sounds detected by sound sensor 101 associated with the opening and closing of doors, the operation of locks, the presence of remote-controlled locks, changes in humidity detected by humidity sensor 105, especially when correlated with associated sounds detected by sound sensor 101 matching the opening and closing of doors. It will also be identified based on sudden temperature changes detected by temperature sensor 110, pressure changes detected by pressure sensor 106, and the correlation of these with each other and with other sensor outputs associated with opening and closing of entrance doors. Knowing that a room is an entry room 132 is important in the context of understanding, in an automated manner, the layout of a space, as illustrated in FIGS. 2 and 3. This is beneficial for burglar alarms.

If a presence 121 is established in an entry room 132 while the alarm is turned on, and the identity 129 or the pseudonym 125 is not detected or recognized as a resident, then this is an indication that the alarm should sound or an alert should be generated. However, if a presence 121 is established in an entry room 132 while the alarm is turned on, and the identity 129 or the pseudonym 125 is detected or recognized as a resident, then a better response is the generation of a notification to the resident, to which the resident based on configuration may have to respond with a confirmation for an alarm not to be generated. However, if a presence 121 is established in a room that is not an entry room 132 but which may only have windows, then this is an indication of burglary, and should result in an alarm whether the alarm is turned on or not.

This demonstrates an important way that the system can automate and improve the protection of users based on an automated understanding of the space, its layout, its users, and the meaning of various critical events. If an intruder is detected while a recognized user is present, based on a detection of the recognized user's pseudonym 125 or identity 129, then the system preferably takes another action than if there is no indication that a user is present. For example, if no user is present, all locks may be locked and all lights may be turned off, along with law enforcement being notified; on the other hand, if a potential intruder is detected and a user is present, a prudent response includes notification of the user, comprising camera footage of the detected intruder and his or her determined location, based on a presence determination. A person skilled in the art will recognize that these are simply exemplary descriptions of functionality, and that they demonstrate the benefits of the disclosed structure, methods and approach. If an increased risk of burglary 136 is detected as being likely, then this is communicated to the backend, and based on the configuration of the system, conveyed to an operator.

The system further detects increased risk of fire 135 based on output of temperature sensor 110 indicating increased temperature, energy consumption changes detected by energy sensor 112 indicative of melting of cables or overheating of appliances, failure detection of appliances as described above, sound profiles based on outputs of sound sensor 101 indicative of fire, changes in humidity or pressure from respective humidity sensor 105 and pressure sensor 106 indicative of fire, as well as combinations of these, and especially correlations of these types of sensor data, from one or more nodes in the network. As for many other disclosed types of detection, it is beneficial for the system to identify such risks in the context of the labeling of the room and the likely presence of gas or other flammable substances where the likely fire is detected.

As for other risks, risk of fire 135 is preferably reported to an automated backend system and also to a human operator, in addition to sounding local alarms and automatically generating notifications for emergency responders in proximity of the residence or business being observed. A pinpointing of the location of the fire is beneficial, as well as all location data of potential users in the space. This is also preferably reported, and can be used by emergency responders to prioritize and guide their efforts.

The risk of an earthquake 137 is important to automatically detect, which is done using data from one or more instances of inertial sensor 107, one or more instances of sound sensor 101, and one or more instances of motion sensor 103. The motion sensor 103 or multiple instances thereof are primarily used to identify the likelihood that shaking detected by inertial sensor 107 is due to a person falling or dropping something. Whereas motion sensors generate local outputs if a person falls or drops something, inertial sensors generate the same principal output no matter where they are located in the house or the neighborhood when the cause of the shaking is an earthquake. When an earthquake is detected, its strength is preferably compared to a threshold and it is determined whether the likely earthquake is sufficiently large; if it is, an action is preferably taken. This action comprises turning off the electricity delivery to all nodes where there is a risk of a gas line rupturing, e.g., in a kitchen 128 or a room 130 with a washer, dryer and/or a water heater for example. If the detected earthquake is stronger than a threshold and takes place at a time when it is dark outside, other rooms are preferably lit to facilitate the evacuation.

Preferably, only outlets and electric nodes connected to light sources are enabled, and electricity to any appliances posing a risk in the context of an earthquake is turned off or reduced until reset by a user or an admin, or until a sufficient amount of time has passed, where this time can be a function of the detected severity of the earthquake 137. Notifications are preferably generated in rooms with user presence, and potentially in all rooms; along with notifications being sent to user devices. It is beneficial for the system to maintain power to nodes that are used to power a router or other communications equipment, as well as to nodes used to generate a mesh network for communication within or between protected buildings. This maintains communication channels at times when this is important for users threatened by risk.

Additionally, the system is configured to identify and locate pet-related activity 138, e.g., based on motion sensor 103, sound sensor 101, or multiple instances of these and other sensors, and the pattern of movement associated with the derived presence 121 of the pets. In situations where pets are chipped, the pets can also be detected by identification using wireless radio of their implanted chips. Knowledge of the existence of a pet or better presence 121 or location of a pet is beneficial in emergency contexts, such as when there is a detected fire 135, and is preferably communicated to emergency responders along with information, when possible to derive, relating to what type of pet it is. That can be determined both based on movement profiles (as indicated by serial readings of distributed presence 121 determination) and sound profiles determined using one or more instances of sound sensor 101.

The system is also configured to determine events such as party-related activity 139, which can be determined based on sound profiles and motion profiles using respective sound sensor 101 and motion sensor 103, and camera 102 output, the presence predicate 121 of multiple users, some of which will be detected using pseudonym 125 based or identity 129 based methods; additionally, the system can determine based on the detected music type predicate 122, sports program predicate 123 and TV show predicate 124 and the locations of presence according to the room labeling illustrated in FIG. 3, that there is a party. Parties may sometime increase certain risks, and accordingly, detecting a party is potentially beneficial. A person skilled in the art will recognize that these are simply exemplary embodiments of the potential of the disclosed system and its benefits, though, and will recognize that the described methods and architecture can be applied to a variety of related contexts, and that this results in similar benefits to those described in this disclosure.

FIG. 2 shows an illustrative example of a set of nodes associated with a space. The nodes in this embodiment include a set of nodes comprising Node 1, Node 2, Node 3, Node 4, Node 5, Node 6, Node 7 and Node 8, also denoted by reference numerals 201, 202, 203, 204, 205, 206, 207 and 208, respectively. It is to be appreciated that other embodiments can include more or fewer nodes. Here, two nodes are connected with a line if they are determined to be in close proximity of each other, as determined by at least one of very high correlation of sensor output signals and sensor output signal strength; and sequential activation in terms of the node with strongest signal output for a selected one or more types of signal types, indicating that a person or other source of sensor input passes from one to the other node neighborhood. This is a self-organizing network, and is determined automatically by the system, as described above and in further detail herein. It also benefits from a labeling of rooms in terms of their functionality, e.g., determining that one of the rooms is a kitchen, and some collection of nodes is associated with this rooms, e.g., by high correlation of sensor outputs or sensor output strengths, or correlated and simultaneous detection of motion or other local events.

In the example shown in FIG. 2, each node corresponds to one or more sensors, and preferably several sensors of several types. The nodes may correspond to the same set of sensors or to different types of sensors, where some nodes may not have overlapping sensor types whereas others will. It is beneficial for most nodes to correspond to as many types of sensors as possible, as this gives a richer input to the system. It is also beneficial with a large number of nodes, and situations where these nodes are co-located or located in the same room or within radio distance and/or earshot from each other. Nodes having speakers can emit low volume sounds, inaudible frequencies, and other nodes, equipped with one or more instances of sound sensor 101 can detect the sounds emitted by nearby nodes. By modifying the volume of the sounds and generating sounds of different pitches, and from different nodes, the system can self-organize a network layout map like that shown in FIG. 2. Different pitches of sound have the property of penetrating different materials to different extents, since they are absorbed by furniture and other objects to different extents. Thus, using different pitches to determine the co-location of two nodes not only allows the system to determine likely presence in the same space or room, but also allows a determination of the extent of obstruction in the room, where the obstruction is of furniture and other articles. Since different materials absorb sounds and radio of different wavelengths to different extents, the system also determines the likely type of furniture, e.g., tables and chairs vs. couches; and the likely presence or absence of wall-to-wall carpets and area rugs. This is also informed by sounds made by users walking in the space, and the extent to which movements are audible.

A similar type of probing and analysis can also be done using radio transmitters/sensors of radio unit 104 with low or variable signal strength. The automated organization of the network map shown in FIG. 2 is also made based on observations of events not generated by any of the nodes, as previously described. Node 1 is determined to be adjacent to Node 2. Node 2 is also determined to be adjacent to Node 1, Node 5, Node 6, Node 3 and Node 8. Node 3 and Node 8 are determined to be likely in the same room or small area as they are both adjacent to Node 2 and Node 4, as well as to each other. Node 7 has not yet been found to be adjacent to any of the other nodes, and may be in a room that is rarely used. This may be a storage room, for example, or a rarely-visited utility room.

FIG. 3 shows the nodes of FIG. 2, but with an associated classification of room type, illustratively including rooms 301, 302, 304 and 305, in accordance with a physical layout of at least a portion of the area. Undetermined room 301 comprises Node 1. Room 305 comprising Node 5 is determined to be a bedroom with a likelihood exceeding a threshold that may be set to a particular value, such as 0.8. Room 302 is determined to be a living room, and comprises Node 2, Node 6, Node 3, and Node 8. Based on correlations between sound that is determined to be associated with a TV, and power consumption from Node 8, which is illustratively an outlet, the system determines that Node 8 is connected to the TV. This enables the user to remotely turn off the TV simply by instructing the service associated with the network to turn off the power to Node 8, or turn it to a sufficiently low voltage that the TV goes into hibernation and is only woken up when the system determines that a user enters room 302, based on presence determination, or when a user utilizes the remote to turn on the TV. Here, the remote may be implemented using any device with network connectivity, allowing the connection to the service provision using an app, a webpage, or associated method. Node 2 in the living room (room 302) is illustratively known by the system to be a switch, and is located next to the door to the living room, as also evidenced by its proximity to Node 5 in room 305, which is determined to be a bedroom. Node 6 is illustratively an outlet whose power consumption profile is associated with a refrigerator. Thus, room 302 is not only a living room, but also likely has a kitchen portion. Alternatively, the space may be a dorm room without a real kitchen facility, as evidenced by the fact that the occupant appears to go out for meals in a predictable manner, and there is no evidence of the space being used for food preparation. Room 304 comprises Node 4, which is illustratively a smart door lock with a camera.

Based on an adjacency matrix associated with the connections between nodes, the system knows that the entrance room is connected to the living room, which in turn is connected to the bedroom. Based on traditional configurations of homes, the system may tentatively assign room 301 to being a study. Based on the absence of connectivity between Node 7 which is illustratively a GFCI outlet, and other nodes, the system may tentatively assign Node 7 to being located outside the home corresponding to rooms 301, 302, 304 and 305; it may, for example be an outlet in the garage. Thus, even nodes that cannot be assigned a room designation or determined to be adjacent to other nodes can sometimes be given a probabilistic assignment of roles based on traditional layouts, the type of node, and other auxiliary information.

Figure 4:
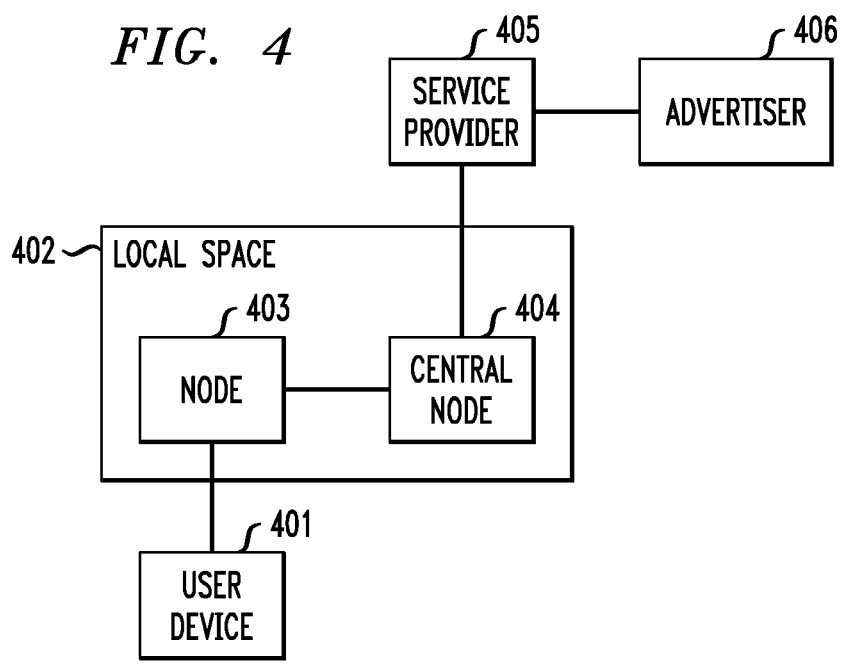
FIG. 4 is a block diagram of an information processing system configured with functionality for determining preferences and events and generating associated outreach therefrom in an illustrative embodiment.

FIG. 4 shows how a user can connect to a node 403 in a local space comprising one or more nodes arranged in a network, using a device 401 such as a smartphone or a tablet, to a service provider 405, which in turn is connected to an advertiser or advertising network 406. The connection from the user device 401 and node 403 is typically made using a central node 404 of the local space 402, where the central node 404 may be a router. The user connects using user device 401, using a webpage or an app, which causes a connection to be established with service provider 405. The user uses this connection to perform customization, to obtain access to access data or control nodes, to register an account, associate an account with a space, to enable service provision, or other related activity in which the user selects, creates or modifies an account. Preferably, the user is also requested to pass an authentication, establish one or more credentials, or request access from another user, or a combination of such functions. As a connection is established, the system, controlled by the service provider is configured. In addition, a connection is preferably made between the user device 401 and the advertiser or advertisement provider 406. This enables automated determination of device identity, generation of a device identifier string, and detection of other activity related to creating an association.

This can be performed at advertiser or advertisement provider 406 between an identity or pseudonym provided by service provider 405 to advertiser/advertisement provider 406 or provided by advertiser/advertisement provider 406 to service provider 405, where the device identity related to the user device 401. In other words, this allows the advertiser/advertisement provider 406 to recognize user device 401, and enables service provider 405 to convey predicates and other information related to user device 401 to advertiser/advertisement provider 406, using the pseudonym established between the service provider 405 and the advertiser/advertisement provider 406. The device identity can use cookies, cache cookies, user agent, flash cookies, unique identifier information stored in an app, and other related methods, as will be appreciated by a person skilled in the art. An app, furthermore, can generate connections to advertiser/advertisement provider 406 using a webview interface, which corresponds to browser traffic.

The establishment of the connection between the user device 401 and the advertiser/advertisement provider 406 can be initiated by the service provider 405 by the service provider 405 redirecting traffic between the user device 401 and the service provider 405 to the advertiser/advertisement provider 406 using a redirect directive, which can be performed in an 0-sized iframe if a browser connection is used, or by opening a webview connection from the user device 401 to the advertiser/advertisement provider 406 if an app is used. A person skilled in the art will appreciate that there are alternative methods of establishing such connections, and that those can alternatively be used instead.

The conveyance of the pseudonym can be performed using a direct connection between the service provider 405 and the advertiser/advertisement provider 406, or can use the user device 401 as a proxy by redirecting traffic to a unique webpage associated with the advertiser/advertisement provider 406, wherein a unique element of the unique webpage comprises a pseudonymous identifier. This is well understood in the art. User device 401 may also request access to a resource local to the local space 402, which causes two requests to be made, one which is associated with the response to the request, and which involves the service provider 405 or a node associated with local space 402; and the other which corresponds to a connection to advertiser/advertisement provider 406. This allows advertiser/advertisement provider 406 to create a profile for user device 401, if it does not already have one, where this profile is stored by advertiser/advertisement provider 406 and associated with the local space 402.

To the extent that service provider 405 can determine that user device 401 corresponds to a user profile with another device that has already been registered with service provider 405 or advertiser/advertisement provider 406, the service provider 405 preferably communicates to advertiser/advertisement provider 406 that that previous device, indexed by its associated pseudonym, corresponds to the currently observed user device 401, allowing the advertiser/advertisement provider 406 to associate both of these devices with the same record. As predicates are obtained by advertiser/advertisement provider 406 from service provider 405, these are associated with the record with which the relevant pseudonym is associated.

This conveyance is preferably performed out of band from service provider 405 to advertiser/advertisement provider 406, and not involving a user device such as user device 401 as a proxy. One alternative way to direct traffic from user device 401 to advertiser/advertisement provider 406 is using a captive portal associated with local space 402 and managed by service provider 405. The captive portal may redirect traffic from the user device 401 to the advertiser/advertisement provider 406, as described above, or using one of the variations known by a person skilled in the art.

The result of these operations is that the advertiser/advertisement provider 406 will have information about end users including device identifiers of user device 401, and also including predicate data related to the associated user. The advertiser/advertisement provider 406 may additionally obtain a feed of temporary relevant data, such as the current needs and interests of the user; the current or recent activities associated with the user; and demographic and other information associated with the user. This is preferably related to a pseudonym 125 or an identity 129, as described above. For privacy reasons, service provider 405 preferably does not provide user identity 129 to advertiser/advertisement provider 406, nor any sensor data directly from the collection of sensors 100, but only related to selected predicates in the set of predicates 120 related to local space 402 being accessed by user device 401. These can include, for example, data related to their optional association with pseudonym 125 or an identity 129 and related record detailing predicates.

Figure 5:
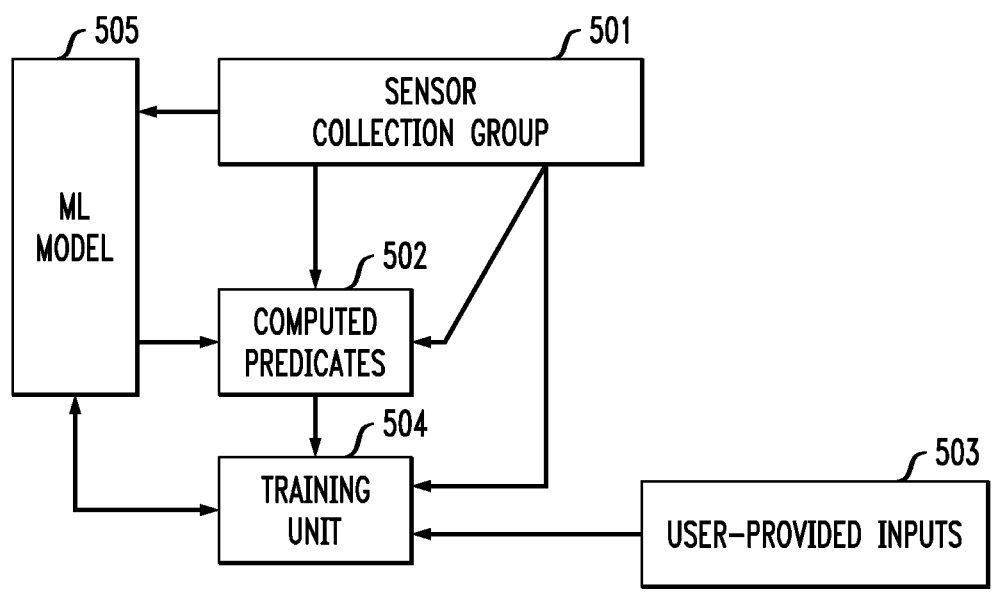
FIG. 5 is a block diagram of an information processing system comprising a set of sensors and a corresponding set of predicates, augmented with machine learning functionality in an illustrative embodiment.

FIG. 5 shows a sensor collection group 501 corresponding to at least a portion of the collection of sensors 100, and the predicates 502 computed from data provided by these sensors. These predicates illustratively correspond to at least a subset of the set of predicates 120 computed from the outputs of the collection of sensors 100 using the heuristic techniques described herein. While FIG. 1 shows the generation of the set of predicates 120 from the single collection of sensors 100, it is beneficial in some embodiments to compute the predicates from multiple collections of sensors. The system also obtains optional user-provided inputs 503, e.g., using the registration feature, or using manual configuration, manual selection of preferences and settings, and similar. The user-provided inputs 503 include information both about recurring users and temporary users. The outputs from the sensor collection group 501, the computed predicates 502, and the user-provided inputs 503 are provided to a training unit 504 that generates or fine-tunes a machine learning or ML model 505. This ML model 505 later obtains inputs from the sensor collection group 501, the computed predicates 502, and generates classifications that are made part of the computed predicates 502.

Tagged data in the outputs of sensor collection group 501 are particularly valuable for the training unit 504 to generate or improve the ML model 505, as these provide the training unit 504 with a baseline truth. Additionally, to the extent that high-confidence predicates are generated in the computed predicates 502, these can be used as tagged data by training unit 504. Here, the confidence is preferably computed using standard statistical methods, such as maximum likelihood, or determined to be high-confidence after having consistent classifications (e.g., of room names) for at least a threshold amount of time. A person skilled in the art will recognize that there are many alternative approaches of determining confidence. High confidence corresponds to the computed confidence, which can be a probability or a score or a collection of values in multiple dimensions, exceeding one or more thresholds that are set by the system. One such threshold is a probability of 95%, and another is a score of temporal consistency indicating that the classifications have been consistent over a period of 10 days, and yet another is that the classifications have been consistent for at least 50 observations of a user that led to a subsequent classification.

Figure 6:
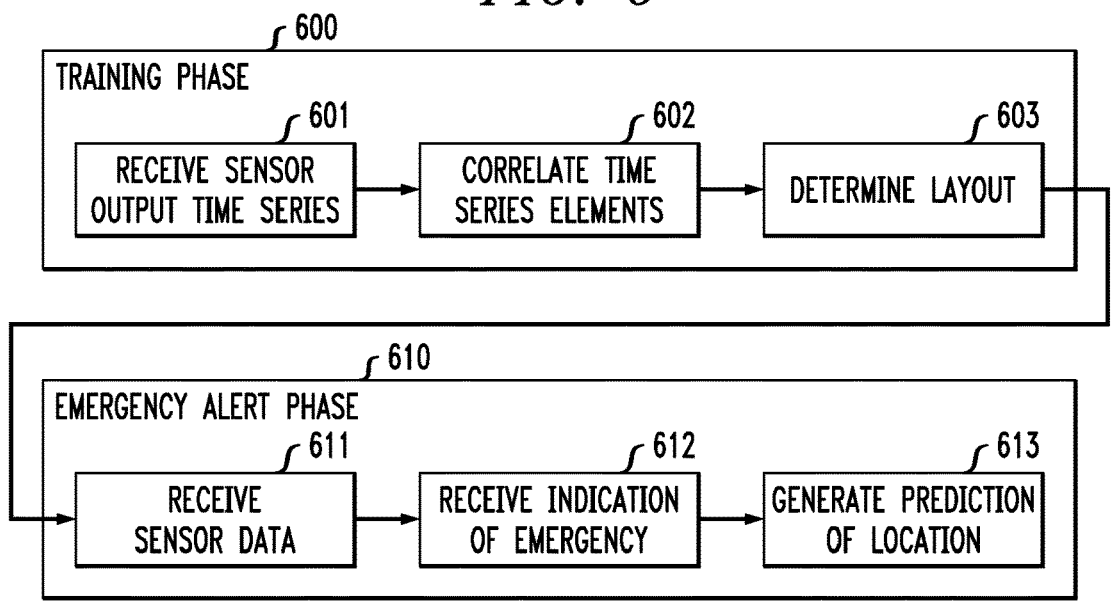
FIGS. 6 through 8 show additional examples that involve determining preferences and events and generating associated outreach therefrom in illustrative embodiments.

FIG. 6 illustrates a training phase 600 and an emergency alert phase 610. Training phase 600 comprises receiving a sensor output time series 601, also referred to herein as "time series data." The time series data may comprise a series of informational elements, where an element comprise a time indicator indicating the time of creation of the element; a sensor descriptor indicating the type and location, or identity, generating an output value; and the output value. For example, the type of a sensor may be "sonar," "microphone," "presence detector," "radio unit," "inertial sensor," etc. The location may correspond to an indication corresponding to an already determined location from layout determination 603. The identity may correspond to an at least locally unique value that corresponds to an identifier that may be generated at installation or manufacturing, and which is associated with a sensor. The output value comprises at least a portion of data generated by the sensor.

The time series data is received by a training unit. The training unit correlates received time series elements in step 602, and uses the correlated time series elements to determine a layout in step 603. In step 611, an emergency alert unit associated with the training unit associated with training phase 600 receives sensor data. In step 612, the emergency alert unit receives an indication of an emergency; this may comprise sensor output, such as from one or more inertial sensors, or it may be obtained from an auxiliary source. In step 613, the emergency alert unit generates a location prediction based at least in part on the layout determined in step 603 and at least in part on the sensor data received in step 611. The generated location prediction may be transmitted to auxiliary recipients, such as emergency responders. The location prediction optionally comprises information related to a classification associated with the sensor data of step 611.

Figure 7:
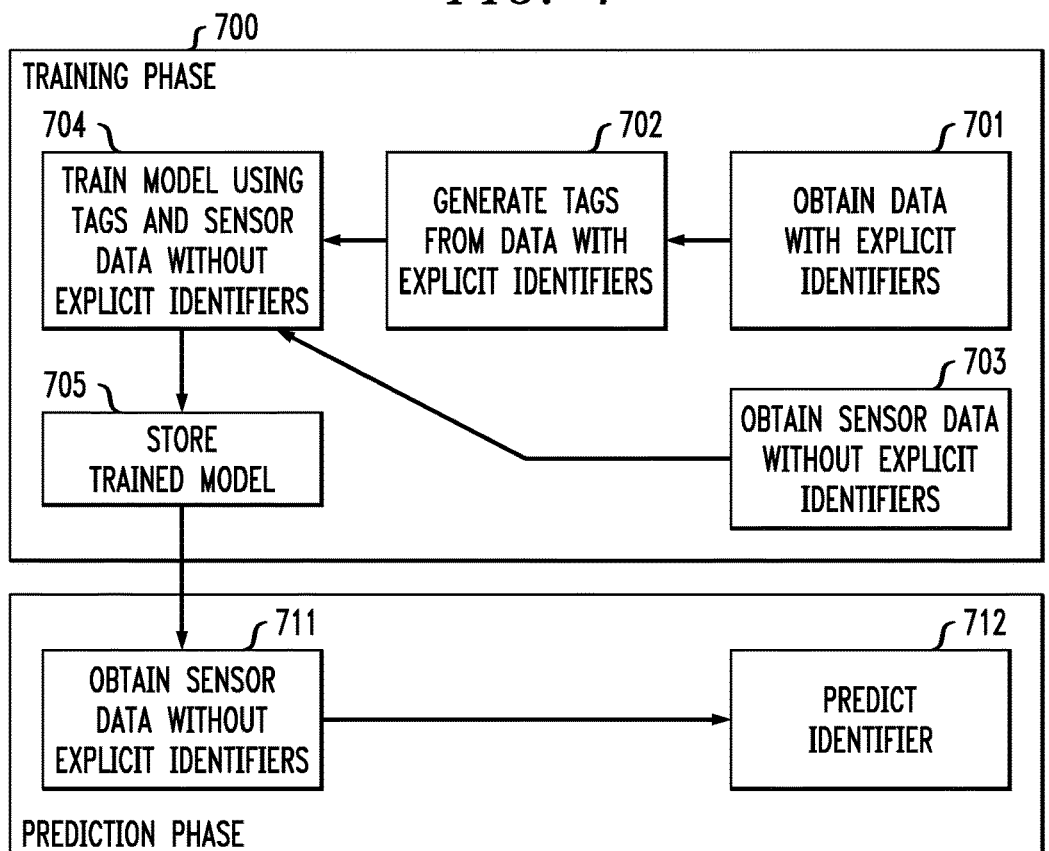

FIG. 7 shows a training phase 700 in which a model is trained and a prediction phase 710 in which a prediction is made. Training phase 700 comprises a step 701 in which a model training unit receives data with explicit identifiers; an example of such data is data associated with a radio identifier such as a MAC address or a Bluetooth identifier, data associated with HTML cookies or data associated with an app. The term "explicit identifier" as used herein is intended to encompass these and other types of information that can be used to identify a particular device and/or a particular user.

The training phase 700 also comprises step 702 in which a tag is generated from one or more data elements comprising explicit identifiers. In step 703, the model training unit receives sensor data that does not comprise explicit identifiers. Examples of such sensor data is sensor data generated by a sonar sensor, a microphone, an inertial sensor, a proximity sensor or a motion sensor. In step 704, a machine learning model or other functionally related model is trained using the sensor data without explicit identifiers, from step 703, and the tags determined in step 702. The training unit stores a trained model in step 705. This trained model is conveyed to a prediction unit, which may be housed in the same hardware unit as the model training unit. In step 711, which is part of the prediction phase 710, the prediction unit receives sensor data without explicit identifiers. In step 712, the prediction unit determines a prediction of an identifier based at least in part on the model generated by the model training unit in training phase 700, and at least in part on the sensor data of step 711. This permits the use of sensor data without explicit identifiers to predict an explicit identifier. Such techniques can be used to identify various types of users, including humans, pets, appliances and household robots. The term "user" as utilized herein is therefore intended to be broadly construed, and can include hardware and/or software entities as well as humans associated with those entities.

Figure 8:
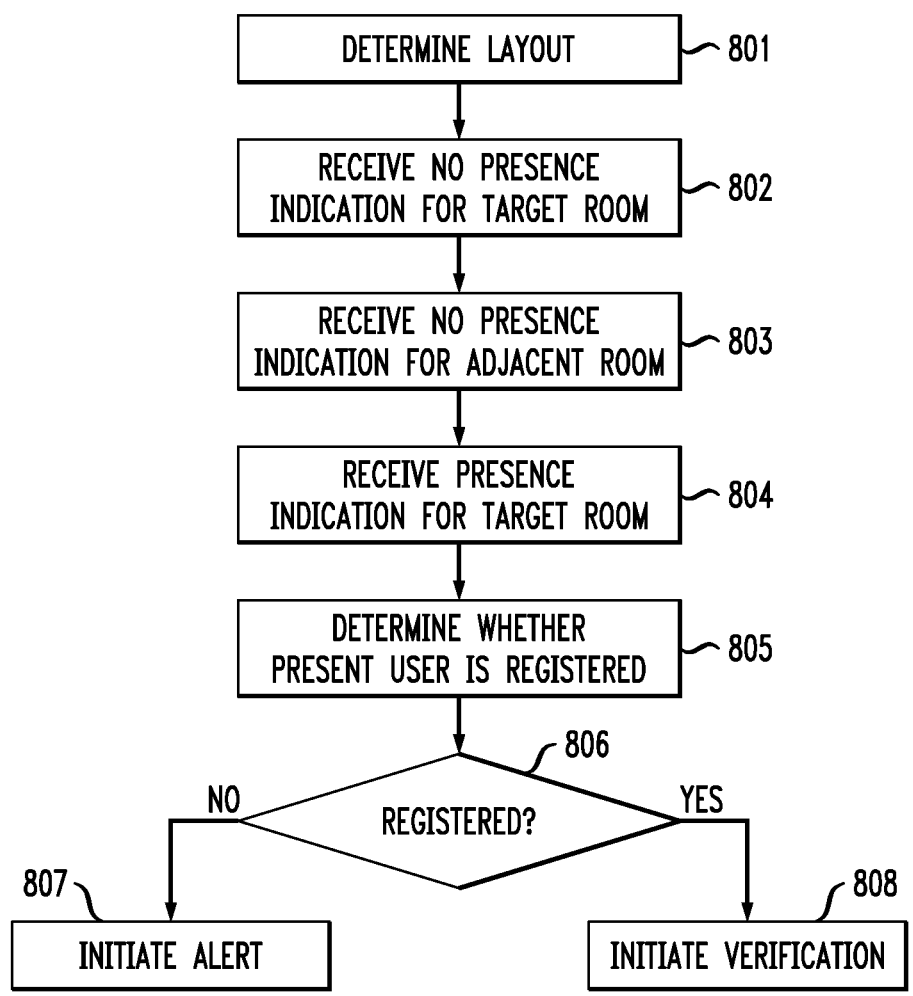

FIG. 8 illustrates an intrusion detection technique. In step 801, a layout is determined, e.g., using the approach described in FIG. 6 or using alternative means such as obtaining a user-provided layout. In step 802, the intrusion detection unit receives an indication that there is no presence of a user in a target room. A target room may, for example, be a bathroom. In step 803, the intrusion detection unit receives an indication that there is also no presence of a user in a room adjacent to the target room. An example room adjacent to a target room may be a bedroom that has an entrance to the bathroom that is the target room. In step 804, the intrusion detection unit receives an indication of a user presence in the target room. Thus, this user did not enter the target room through the adjacent room, since there was a preceding indication that there was no presence in the adjacent room. Typically, this means that a person entered the target room through an open or broken window. In step 805, it is determined whether the detected user in the target room is registered, e.g., by determining if the user corresponds to a known identifier such as a radio identifier or a predicted identifier as described in FIG. 7.

In step 806, a comparison is made whether there is a likely match to a registered user. Here, user registration may correspond to an explicit user action or may be based on repeated historical observation of identifiers associated with the user. If there is a match, then the intrusion detection unit initiates a verification in step 808. Such verification may comprise sending the matched user a notification and requesting a response, such as a confirmation of presence, the authentication using biometric techniques, etc. If there is no match, the intrusion detection unit initiates an alert in step 807. This may comprise sounding an alarm, sending messages informing registered users of the potential intrusion, or the collection of additional data, such as video data that may normally not be collected due to privacy concerns.

The particular features and other advantages described above are examples presented in the context of illustrative embodiments, and therefore such features and advantages need not be present in other embodiments.

For example, references herein to "a system" or "the system" in conjunction with various distinct types of features or functionality should not be construed as a requirement that all such features or functionality be present within the same single system. Instead, different systems in different embodiments can include different combinations or other arrangements of the various disclosed features and functionality.

Illustrative embodiments include systems, methods, apparatus and computer program products comprising non-transitory storage media storing program code.

For example, in some embodiments a system for generating user predicates uses at least one node comprising a set of sensors, said set of sensors comprising at least two of a sound sensor, a motion sensor, a camera, a humidity sensor, a pressure sensor, a carbon monoxide sensor, an air-quality sensor, an energy consumption sensor, a temperature sensor, an inertial sensor and a radio unit.

The system in some embodiments generates a location estimate for a person based on output from the at least two of the set of sensors. The system also generates a room descriptor based on the location estimate and output from the at least two of the set of sensors. In addition, the system generates a user action determination based on at least two of the room descriptor, the location estimate and the at least two of the set of sensors. The user action illustratively comprises at least one of determination of a music genre, a sports type, an entertainment genre, a risk of burglary, a risk of fire, a risk of a fall, a risk of earthquake, a need for maintenance, a need for a product, a need for a service, and a need for a notification.

In some embodiments, the system is further configured to generate a map based on at least two space descriptors and at least a time-based series of correlated events, wherein it is determined whether a first space and a second space associated with the at least two space descriptors are connected to each other, and wherein a space corresponds to at least one of a room and an outdoor area.

The above-noted radio unit is illustratively used to generate a user pseudonym associated with a user for which a location estimate has been generated, and wherein the user action is associated with the user pseudonym. In some embodiments, the user identity is associated with the user pseudonym during a registration event.

The system in some embodiments is configured such that at least a portion of the location data is transmitted to first responders when the event is one of the risk of burglary, the risk of fire, the risk of a fall and the risk of earthquake.

Additionally or alternatively, power, gas, or similar utility or safety related function is automatically turned off in response to detecting at least one of the risk of fire and the risk of earthquake.

The system in some embodiments generates a commercial offer in response to at least one of the music genre, the sports type, the entertainment genre, the need for maintenance, the need for a product and the need for a service.

Illustrative embodiments include a control system configured to receive, from a sensor network comprising at least one radio sensor and one proximity sensor, a first signal comprising at least an indication of a first radio detection and an indication of a first proximity detection. The control system illustratively generates a profile associated with an entity, stores in the profile data associated with at least one of the first radio detection and the first proximity detection, receives a second signal comprising at least an indication of a second radio detection and an indication of a second proximity detection, generates a predicate based at least on data associated with the profile and the second signal, and transmits the predicate to a registered entity.

In some embodiments, no additional information comprised in the first or second signal is transmitted to the registered entity.

The registered entity may comprise, for example, at least one of an advertiser, a third party service provider, and a user associated with the system. As another example, the registered entity may comprise an emergency responder.

A given one of the indications of radio detection illustratively comprise one of a MAC address, a Bluetooth Identifier or a unique identifier associated with a software application, although numerous other indications of radio detection can be used.

In some embodiments, the predicate indicates at least one of the presence of a registered user, the presence of a user other than the registered user, the absence of the registered user or the absence of a user other than the registered user.

Additionally or alternatively, the predicate can indicate an activity associated with an entity associated with at least one of the second radio detection and the second proximity detection.

As another example, the predicate can indicate a classification associated with an entity associated with at least one of the second radio detection and the second proximity detection, wherein the classification corresponds to at least one of a human, a robot and an appliance.

These and other particular features of illustrative embodiments are presented by way of example only, and should not be viewed as limiting in any way.

The above-described system and other processing entities described herein may be part of an information processing system. A given such entity in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, a microcontroller, an application-specific integrated circuit (ASIC), a field-programmable gate array (FPGA), a central processing unit (CPU), an arithmetic logic unit (ALU), a digital signal processor (DSP), a graphics processing unit (GPU) or other similar processing device component, as well as other types and arrangements of processing circuitry, in any combination.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

Processing devices in a given embodiment can include, for example, laptop, tablet or desktop personal computers, mobile telephones, or other types of computers or communication devices, in any combination.

Communications between the various elements of an information processing system comprising processing devices associated with respective parties or other system entities may take place over one or more networks. Such networks can illustratively include, for example, a global computer network such as the Internet, a wide area network (WAN), a local area network (LAN), a satellite network, a telephone or cable network, a cellular network such as a 4G or 5G network, a wireless network implemented using a wireless protocol such as Bluetooth, NFC, WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure.

Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. As indicated previously, the network may comprise any type of network, including by way of example a global computer network such as the Internet, a WAN, a LAN, a satellite network, a telephone or cable network, a cellular network such as a 4G or 5G network, a wireless network implemented using a wireless protocol such as Bluetooth, NFC, WiFi or WiMAX, or various portions or combinations of these and other types of communication networks.

Each processing device of the processing platform comprises a processor coupled to a memory. As indicated above, the processor may comprise a microprocessor, a microcontroller, an ASIC, an FPGA, a CPU, an ALU, a DSP, a GPU or other type of processing circuitry, as well as portions or combinations of such circuitry elements. The memory may comprise RAM, ROM, flash memory or other types of memory, in any combination.

Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, a storage array, a storage disk, an integrated circuit containing RAM, ROM, flash memory or other electronic memory, or any of a wide variety of other types of computer program products.

Also included in the processing device is network interface circuitry, which is used to interface the processing device with the network and other system components, and may comprise conventional transceivers.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines, such as operating system level virtualization infrastructure comprising Docker containers or other types of containers implemented using respective Linux kernel control groups. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components or functionality of the system as disclosed herein can be implemented at least in part in the form of one or more software programs stored in memory and executed by a processor of a processing device.

Accordingly, a given component of an information processing system implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and processing devices than those utilized in the particular illustrative embodiments described herein, and in numerous alternative preference, event and outreach related processing contexts. Also, the particular types and configurations of system entities, processing devices and process operations can be varied in other embodiments. In addition, the particular assumptions made herein in the context of describing aspects of certain illustrative embodiments need not apply in other embodiments. These and numerous other alternative embodiments will be readily apparent to those skilled in the art.

What is claimed is:

1. An apparatus comprising:
   at least one processing device comprising a processor coupled to a memory;
   said at least one processing device being configured:
   to determine a physical layout of at least a portion of an area that includes a set of sensor devices of a sensor network;
   to receive data generated by at least a subset of the set of sensor devices, the subset comprising at least a first sensor device of a first type and a second sensor device of a second type different than the first type;
   to compute one or more predicates based at least in part on the physical layout and the received data; and
   to take at least one automated action based at least in part on the one or more computed predicates.

2. The apparatus of claim 1 wherein said at least one processing device implements at least one node of a plurality of interconnected nodes coupled to the sensor network comprising the set of sensor devices.

3. The apparatus of claim 1 wherein the area that includes the set of sensor devices of the sensor network comprises at least one of an interior space and an exterior space associated with a building or other structure.

4. The apparatus of claim 1 wherein the first sensor device of the first type comprises a proximity sensor and the second sensor device of the second type comprises a radio sensor.

5. The apparatus of claim 1 wherein determining a physical layout of at least a portion of an area that includes a set of sensor devices of a sensor network comprises:
   receiving time series data from one or more of the sensor devices;
   correlating informational elements of the received time series data; and
   determining the physical layout from the correlated elements of the received time series data.

6. The apparatus of claim 1 wherein determining a physical layout of at least a portion of an area that includes a set of sensor devices of a sensor network comprises determining the physical layout in a training phase implemented by a training unit of said at least one processing device utilizing a machine learning model.

7. The apparatus of claim 1 wherein receiving data generated by at least a subset of the set of sensor devices comprises:
   receiving from each of one or more of the sensor devices time series data comprising a series of informational elements, with each such informational element comprising a time indicator, a sensor device indicator and at least one output value;

wherein the sensor device indicator comprises information determined at least in part from the physical layout.

8. The apparatus of claim 1 wherein computing one or more predicates based at least in part on the physical layout and the received data comprises:
obtaining first received data that includes one or more explicit identifiers;
obtaining second received data comprising sensor data without explicit identifiers; and
computing from the first and second received data at least one anonymized predicate that does not include any explicit identifier;
wherein the anonymized predicate is indicative of at least one of:
an activity associated with a user within the area; and
a classification of a user within the area.

9. The apparatus of claim 1 wherein computing one or more predicates based at least in part on the physical layout and the received data comprises:
computing first presence information utilizing data received from the first sensor device;
computing second presence information utilizing data received from the second sensor device; and
computing the one or more predicates based at least in part on the physical layout and the first and second presence information.

10. The apparatus of claim 1 wherein computing one or more predicates based at least in part on the physical layout and the received data comprises:
receiving an indication of an emergency situation; and
computing a location prediction for the emergency situation from the physical layout and the received data.

11. The apparatus of claim 1 wherein taking at least one automated action based at least in part on the one or more computed predicates comprises:
determining presence or absence of a user within a particular portion of the physical layout from the one or more computed predicates;
responsive to presence of a user, determining if the user is a registered user;
responsive to the user being a registered user, initiating a user verification process for the registered user; and
responsive to the user not being a registered user, initiating an alert.

12. The apparatus of claim 1 wherein taking at least one automated action based at least in part on the one or more computed predicates comprises:
determining presence or absence of an emergency situation within the area from the one or more computed predicates;
responsive to presence of an emergency situation, performing at least one of:
transmitting a location prediction for the emergency situation to one or more designated recipients; and
controlling one or more pieces of automated equipment associated with the area so as to limit potentially adverse impacts of the emergency situation.

13. The apparatus of claim 1 wherein said at least one processing device is further configured:
to obtain data containing explicit identifiers;
to generate tags from the data containing explicit identifiers;
to obtain sensor data without explicit identifiers; and
to train a model using the tags and the sensor data without explicit identifiers.

14. The apparatus of claim 13 wherein said at least one processing device is further configured:
to obtain additional sensor data without explicit identifiers; and
to utilize the trained model to predict an explicit identifier from the additional sensor data.

15. A method comprising:
determining a physical layout of at least a portion of an area that includes a set of sensor devices of a sensor network;
receiving data generated by at least a subset of the set of sensor devices, the subset comprising at least a first sensor device of a first type and a second sensor device of a second type different than the first type;
computing one or more predicates based at least in part on the physical layout and the received data; and
taking at least one automated action based at least in part on the one or more computed predicates;
wherein the method is performed by at least one processing device comprising a processor coupled to a memory.

16. The method of claim 15 wherein computing one or more predicates based at least in part on the physical layout and the received data comprises:
obtaining first received data that includes one or more explicit identifiers;
obtaining second received data comprising sensor data without explicit identifiers; and
computing from the first and second received data at least one anonymized predicate that does not include any explicit identifier;
wherein the anonymized predicate is indicative of at least one of:
an activity associated with a user within the area; and
a classification of a user within the area.

17. The method of claim 15 wherein taking at least one automated action based at least in part on the one or more computed predicates comprises:
determining presence or absence of a user within a particular portion of the physical layout from the one or more computed predicates;
responsive to presence of a user, determining if the user is a registered user;
responsive to the user being a registered user, initiating a user verification process for the registered user; and
responsive to the user not being a registered user, initiating an alert.

18. A computer program product comprising a non-transitory processor-readable storage medium having stored therein program code of one or more software programs, wherein the program code when executed by at least one processing device causes said at least one processing device:
to determine a physical layout of at least a portion of an area that includes a set of sensor devices of a sensor network;
to receive data generated by at least a subset of the set of sensor devices, the subset comprising at least a first sensor device of a first type and a second sensor device of a second type different than the first type;
to compute one or more predicates based at least in part on the physical layout and the received data; and
to take at least one automated action based at least in part on the one or more computed predicates.

19. The computer program product of claim 18 wherein computing one or more predicates based at least in part on the physical layout and the received data comprises:
obtaining first received data that includes one or more explicit identifiers;

obtaining second received data comprising sensor data without explicit identifiers; and computing from the first and second received data at least one anonymized predicate that does not include any explicit identifier;

wherein the anonymized predicate is indicative of at least one of:

an activity associated with a user within the area; and a classification of a user within the area.

20. The computer program product of claim 18 wherein taking at least one automated action based at least in part on the one or more computed predicates comprises:

determining presence or absence of a user within a particular portion of the physical layout from the one or more computed predicates;

responsive to presence of a user, determining if the user is a registered user;

responsive to the user being a registered user, initiating a user verification process for the registered user; and responsive to the user not being a registered user, initiating an alert.

* * * * *